United States Patent [19]

Vinciarelli

[11] Patent Number: 5,291,385
[45] Date of Patent: Mar. 1, 1994

[54] ZERO-CURRENT SWITCHING FORWARD POWER CONVERTER OPERATING IN DAMPED REVERSE BOOST MODE

[75] Inventor: Patrizio Vinciarelli, Boston, Mass.
[73] Assignee: VLT Corporation, San Antonio, Tex.
[21] Appl. No.: 862,490
[22] Filed: Apr. 2, 1992
[51] Int. Cl.$^5$ ............................................. H02M 3/335
[52] U.S. Cl. ........................................ 363/20; 363/21
[58] Field of Search ............................ 363/21, 28, 20; H02M 3/335

[56] References Cited

U.S. PATENT DOCUMENTS

| | | |
|---|---|---|
| 4,415,959 | 11/1983 | Vinciarelli ............................. 363/21 |
| 4,831,507 | 5/1989 | Colley et al. ........................... 363/21 |
| 5,235,502 | 8/1993 | Vinciarelli et al. ................... 363/20 |

FOREIGN PATENT DOCUMENTS

| | | |
|---|---|---|
| 344067 | 11/1989 | European Pat. Off. . |
| 429310 | 5/1991 | European Pat. Off. . |
| 2608857 | 6/1988 | France . |

*Primary Examiner*—William H. Beha, Jr.
*Attorney, Agent, or Firm*—Fish & Richardson

[57] ABSTRACT

In a zero-current switching forward converter both a unidirectional conducting device and a circuit consisting of a switch in series with a dissipative element are connected across the energy transfer capacitor in the output circuit of the converter. The switch is turned off at the beginning of an energy transfer cycle and is turned on when the voltage across the energy transfer capacitor returns to zero. At relatively high values of load, current flowing in the converter output inductor in the direction of the load will be bypassed around the energy transfer capacitor by the unidirectional conducting device and converter operation will be the same as a prior art zero-current switching forward converter. At low values of load, however, where current reversal may occur in the output inductor, the dissipative element will serve to damp the time varying response of the capacitor to the reverse flow of current in the output inductor and the variation of the voltage across the capacitor will be smooth and predictable. The value of the dissipative element is chosen so that the circuit formed by the dissipative element, capacitor and output inductor is approximately critically damped. In this way the frequency variation of the converter with variations in load is reduced, the output ripple of the converter is reduced and discontinuous operating modes are avoided.

16 Claims, 17 Drawing Sheets

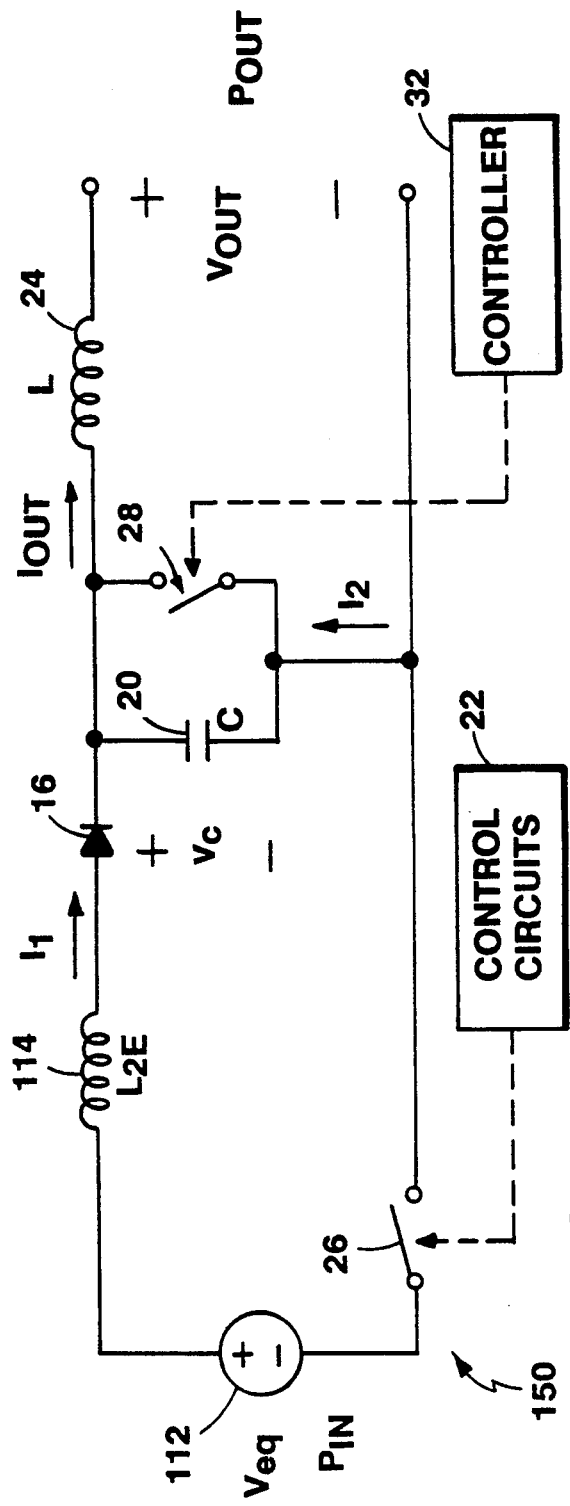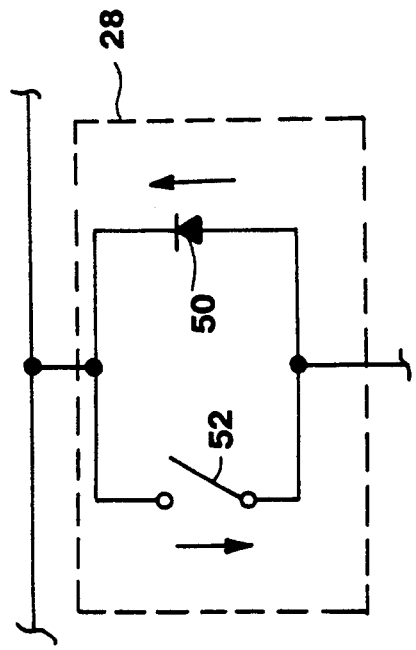
FIG. 2B
FIG. 3

5,291,385

ZERO-CURRENT SWITCHING FORWARD POWER CONVERTER OPERATING IN DAMPED REVERSE BOOST MODE

BACKGROUND OF THE INVENTION

This invention relates to zero-current switching, forward power conversion.

One such power converter (e.g., the one described in Vinciarelli, U.S. Pat. No. 4,415,959, issued Nov. 15, 1983, assigned to the same assignee as this application, incorporated herein by reference) transfers energy from a voltage source for delivery to a load using a transformer that has a controlled amount of effective secondary leakage inductance (e.g., a leakage reactance transformer). On the source side of the transformer, a first switch is connected in series with the source and the primary winding of the transformer. The first switch connects the source to and disconnects it from the primary winding in a succession of energy transfer cycles. On the load side of the transformer, a first unidirectional conducting device and a capacitor are connected in series with the secondary winding. The capacitor and the effective leakage inductance define a characteristic time scale for the cycling of the first switch such that the first switch is cycled on and off at times when the current in the effective leakage inductance and the first unidirectional conducting device are essentially zero. The first unidirectional conducting device constrains current flow in the effective leakage inductance to be directed only in the direction of the load, thereby preventing bidirectional energy flow (resonance) from occurring between the effective leakage inductance and the capacitor. Energy is transferred to the load via a second inductor whose value is large in comparison with the effective leakage inductance. This second inductor effectively appears as a current sinking load across the capacitor. A second unidirectional conducting device connected in parallel with the capacitor prevents charging of the capacitor when the capacitor voltage returns to zero and current flowing in the second inductor is in the direction of the load. In the topology so described, the parameters of the circuit elements and the requirement of zero-current switching constrain the converter to unidirectionally transfer an essentially fixed amount of energy during every energy transfer cycle. Because the output power is the product of that fixed amount of energy multiplied by the frequency of occurrence of the energy transfer cycles, maintaining an essentially fixed load voltage as the converter load is varied requires that the frequency of occurrence of the energy transfer cycles be varied essentially in proportion to the converter load. As a result, the operating frequency (i.e., the rate of occurrence of energy transfer cycles) of such a converter will tend to vary widely as load is varied.

One way of reducing the operating frequency range of a zero-current switching forward converter is disclosed in Vinciarelli, "Zero-Current Switching Forward Power Conversion With Controllable Energy Transfer", U.S. patent application Ser. No. 07/799,675, filed Nov. 21, 1991, now abandoned (incorporated herein by reference). In the converter circuit disclosed therein, the second unidirectional conducting device is replaced with a bidirectional load-side switch (or a second unidirectional switch is placed in parallel with the second unidirectional conducting device). By opening and closing the bidirectional switch at appropriate times, in synchronism with the opening and closing of the first switch, the amount of forward energy transferred during a converter operating cycle may be controlled on a cycle-by-cycle basis. In one operating mode, referred to as reverse boost mode, the energy transferred during each operating cycle is reduced (relative to the energy which would be transferred in a zero-current switching converter without the bidirectional switch) as load is reduced. As a result, as load is reduced, a converter operating in the reverse boost mode must produce more energy transfer cycles than an unboosted converter in order to deliver the same amount of power to the load. Thus, the minimum operating frequency of a converter operating in reverse boost mode is higher than the minimum operating frequency of an unboosted converter, and the variation in operating frequency with load is reduced.

SUMMARY OF THE INVENTION

The invention adds a damping resistor in series with the load-side switch in a zero-current switching forward converter of the kind which has been configured to operate in a reverse boost mode. By limiting and reducing the peak value of the reverse current which can flow in the load-side switch during the reverse boost mode of operation (i.e., as the converter output load is reduced), the damping resistor effects a reduction in the converter's peak-to-peak output ripple voltage. This is accomplished without sacrificing the key benefits of the reverse boost operating mode: reduction in the operating frequency range of the converter and effective elimination of "discontinuous" modes of operation at low values of load.

Thus, in general, in one aspect, the invention features a zero-current switching forward converter circuit for delivering power to a load. The converter topology includes a power source and a power transformer including primary and secondary windings and having an effective secondary leakage inductance L2e. A first switching device is connected to couple the power source across the primary winding of the transformer. A first unidirectional conducting device is connected in series with the secondary winding and oriented to conduct during conduction by the first switching device. A capacitor of capacitance C is connected in series with the secondary winding and the first unidirectional conducting device. An inductor of inductance Lo is connected in series between the capacitor and the load to deliver power to the load. Circuit means are connected on the secondary side of the transformer for preventing charging of the capacitor when voltage across the capacitor returns essentially to zero and when current in the inductor is flowing in the direction of the load. A second switching device is connected on the secondary side of the transformer, and damping means are provided for damping a resonant circuit formed by the inductor and the capacitor at times when the second switching device is closed and the current in the inductor is flowing in a direction away from the load. The damping means includes a dissipative element connected on the secondary side of the transformer. A controller is provided with means for closing and opening the first switching device to transfer power from the power source via the effective leakage inductance of the transformer to charge the capacitance during an energy transfer cycle having a characteristic time scale of $\pi \cdot \sqrt{L2e \cdot C}$. The controller causes the first switching device to open at times when current in the secondary winding is substantially zero, and includes second means for opening and closing the second switching device to selectively govern the amount of energy transferred during the energy transfer cycle.

Embodiments of the invention include the following features. The dissipative element comprises a damping resistor having a value between ¼*sqrt (Lo/C) ohms and sqrt(Lo/C) ohms (preferably essentially equal to ½*sqrt(Lo/C) ohms, which value corresponds to the critically damped case).

In some in embodiments, the dissipative element is a fixed value resistor; in other embodiments it is a positive temperature coefficient thermistor.

In some embodiments, the second means for opening and closing the second switching device comprises means for detecting closure of the first switching device, and means for opening the second switching device at substantially the same time that the first switching device is closed. In some embodiments, the second means for opening and closing the second switching device further comprises means for detecting the voltage across the capacitor and means for closing the second switching device when the voltage across the capacitor is substantially zero.

In some embodiments, the circuit means comprises a second unidirectional conducting device connected across the capacitor, and the second switching device and dissipative element form a series circuit which is connected across the capacitor. In some embodiments, the second switching device comprises a switch capable of unidirectional conduction when closed, and the second switching device and the second unidirectional conducting device are oriented to conduct in opposite directions.

In some embodiments, the second switching device is a field effect transistor; in other embodiments it is a bipolar transistor.

In general, in another aspect, the invention also includes a method for controlling the converter circuit in a damped reverse boost mode by closing the second switching device when the voltage across the capacitor is substantially zero to minimize oscillations in the voltage across the capacitor in response to reverse current flow in the inductor.

In preferred embodiments of the method, the second switching device is opened at substantially the same time that the first switching device is closed.

Other advantages and features will become apparent from the following description of the preferred embodiments, and from the claims.

DESCRIPTION

We first briefly describe the drawings.

FIG. 2B is an equivalent circuit of the converter of FIG. 2A.

FIG. 3 shows a portion of an alternate embodiment of the zero-current switching converter of FIG. 2.

FIGS. 4A-E show current and voltage waveforms useful in describing the reverse boost mode of operation of the converter circuit schematically shown in FIG. 2.

Figure 5:
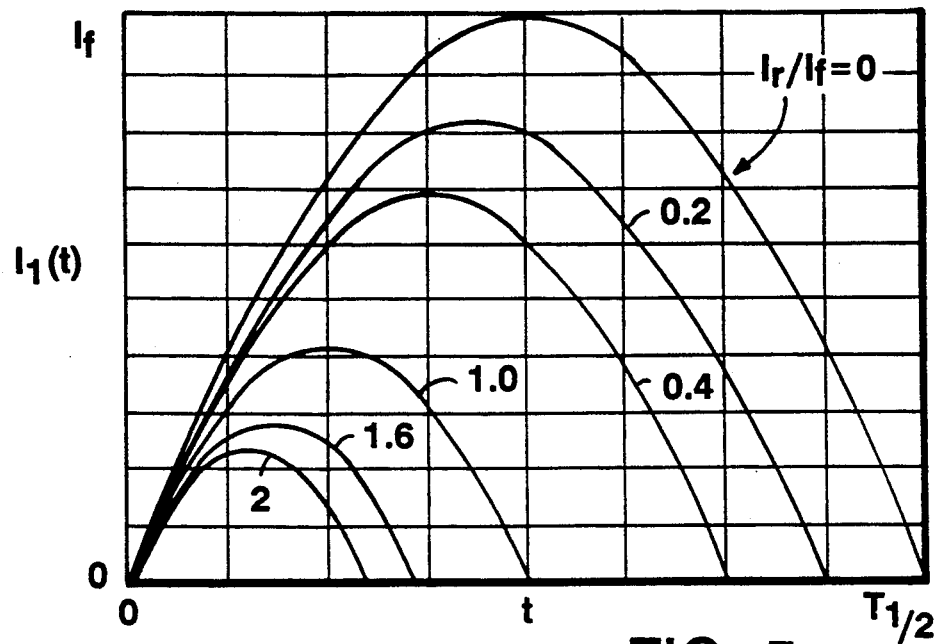

FIG. 5 shows the effect of different negative values of output current at the initiation of an energy transfer cycle on the waveforms of converter forward current during the reverse boost mode of operation in the converter of FIG. 2.

Figure 6:
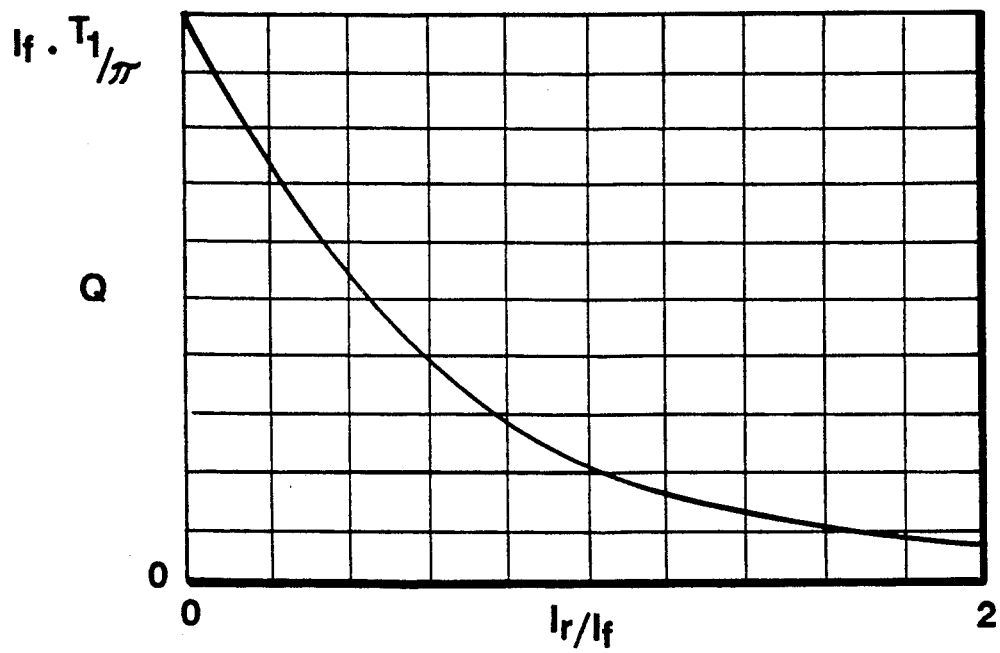

FIG. 6 shows the effect of different negative values of output current at the initiation of an energy transfer cycle on forward charge transferred by the converter of FIG. 2 during the reverse boost mode of operation.

Figure 7:
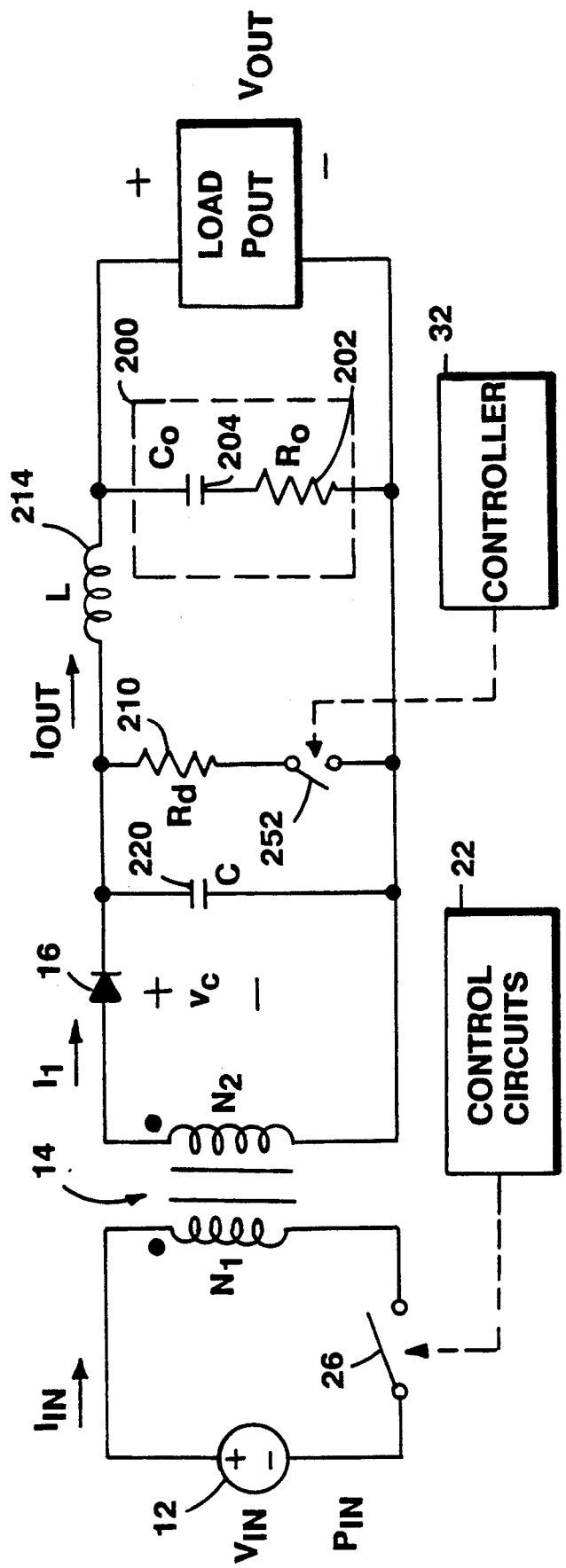

FIG. 7 is a schematic of an embodiment of a zero-current switching converter according to the present invention which includes a damping resistor.

FIGS. 8A-D and 9A-C show current and voltage waveforms useful in describing the damped reverse boost mode of operation of the converter of FIG. 7.

Figure 10A:
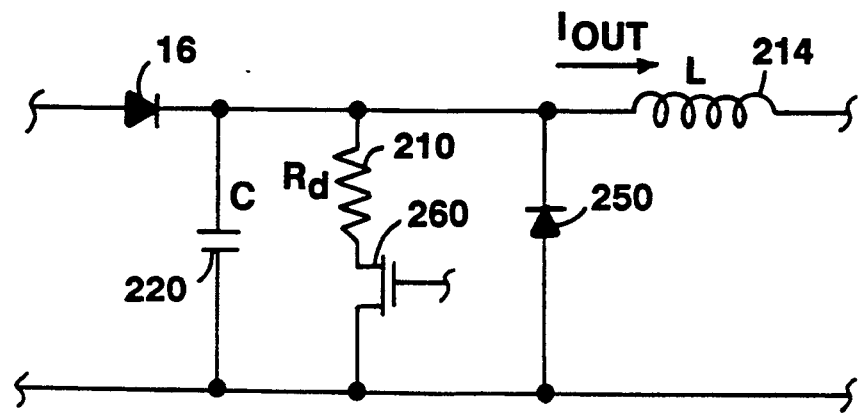

FIG. 10A shows an embodiment of the second switching device of FIG. 7 using a field effect transistor.

Figure 10B:
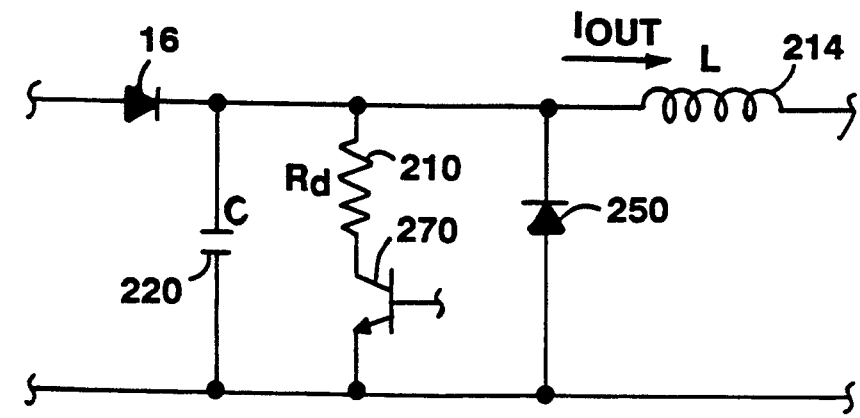

FIG. 10B shows another embodiment of the second switching device of FIG. 7.

Figure 11:
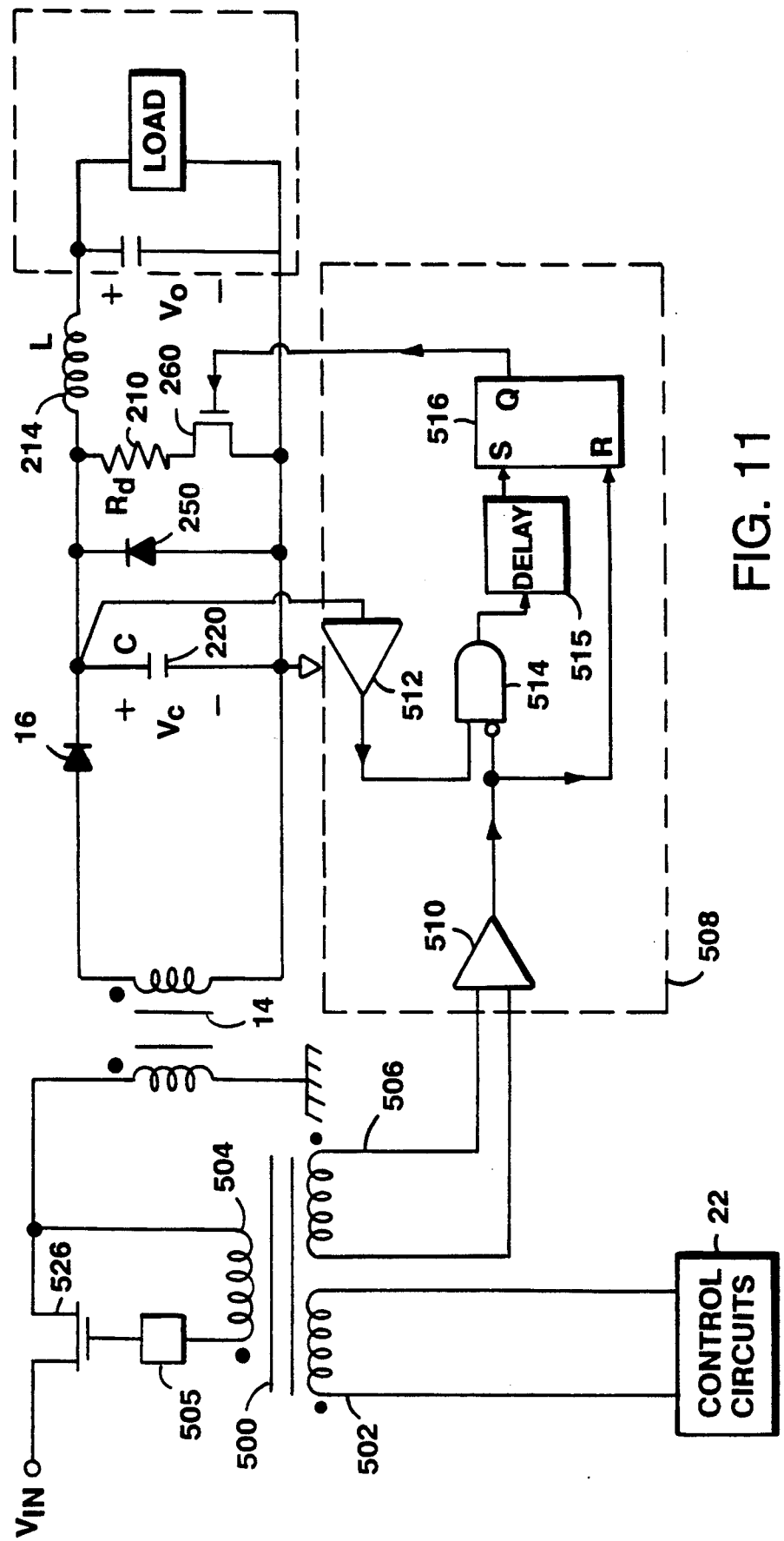

FIG. 11 shows one way of turning the second switching device of FIG. 7 on and off in a damped reverse boost mode of operation.

Figure 12:
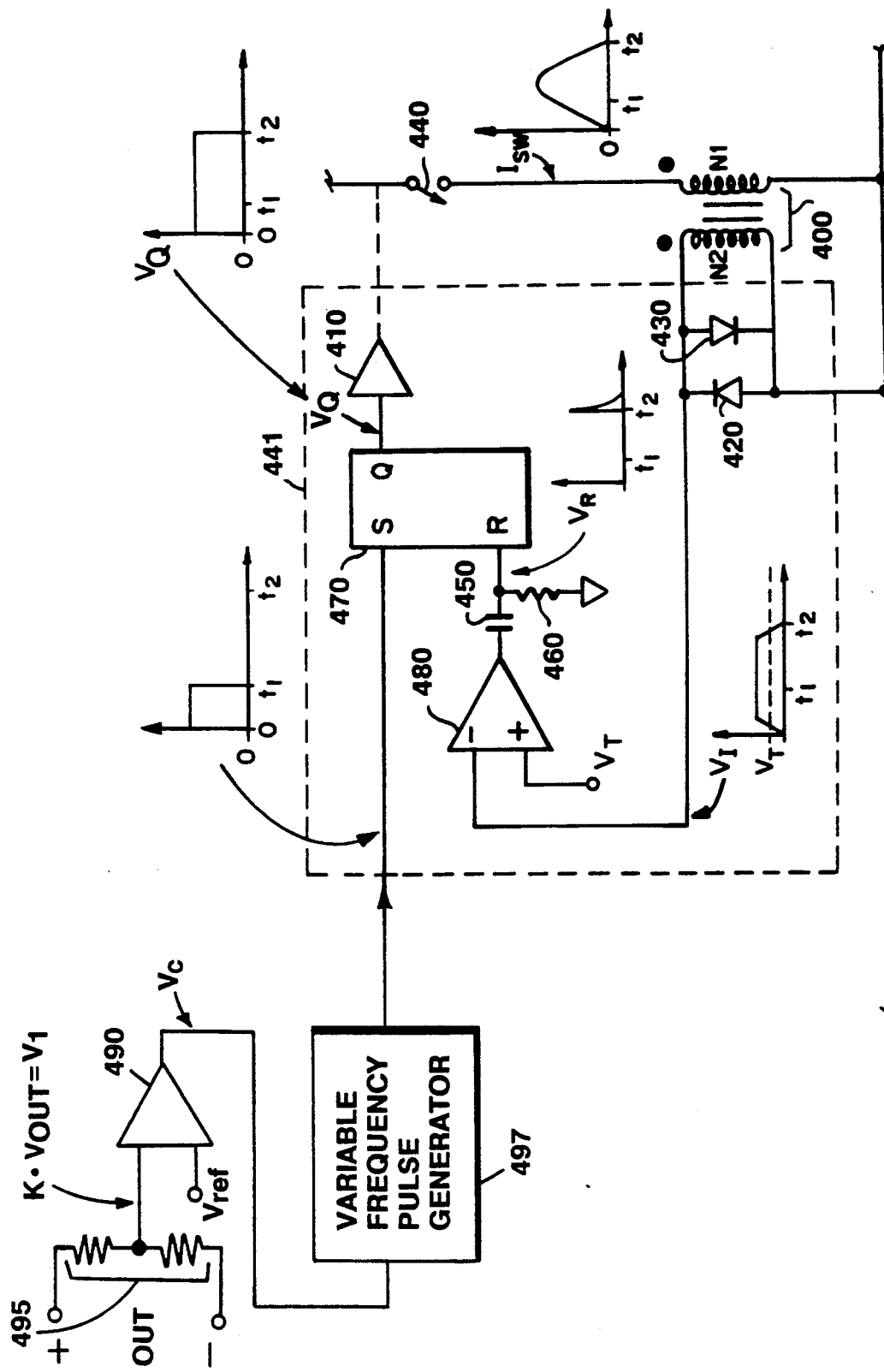

FIG. 12 shows one way of controlling the first switching device in the converter of FIG. 7.

The underlying circuit topology of the present invention is discussed in U.S. Pat. No. 4,415,959, and is shown in schematic form in FIG. 1A and in equivalent circuit form in FIG. 1B. In converter 110 of FIG. 1B, power is transferred from a transformed input source 112 of voltage Veq (of approximate value Veq=Vin*(N2/N1), where N2 and N1 are the number of turns on the secondary and primary windings of the leakage reactance transformer 14, respectively) to a load whose voltage is regulated to be at a value Vout. As explained in Appendices I and II (all Appendices are set forth below and are incorporated by reference) the effects of the second unidirectional conducting device 18 on converter operation are: (a) to constrain the average value of the current I2 to positive values in the direction of the arrow, thereby limiting the converter to operation only in a "buck" mode; and (b) to make converter operating frequency essentially proportional to load. As also explained in Appendix III, the converter of FIGS. 1A-B incorporates no mechanism for controlling the effects of reverse energy transfer from the load to the capacitor, as will occur at low values of load when current in the second inductor reverses during an operating cycle.

Figure 1A:
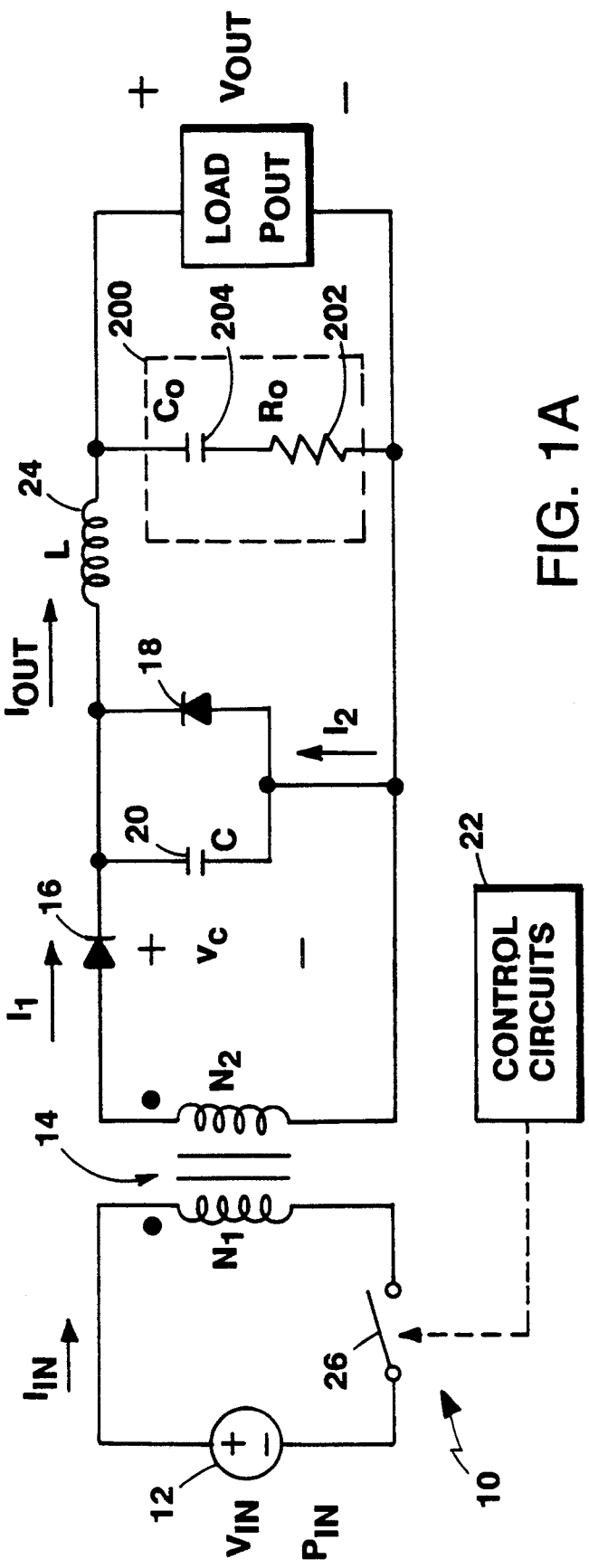
FIG. 1A is a schematic of a prior art zero-current switching forward converter.
Figure 2A:
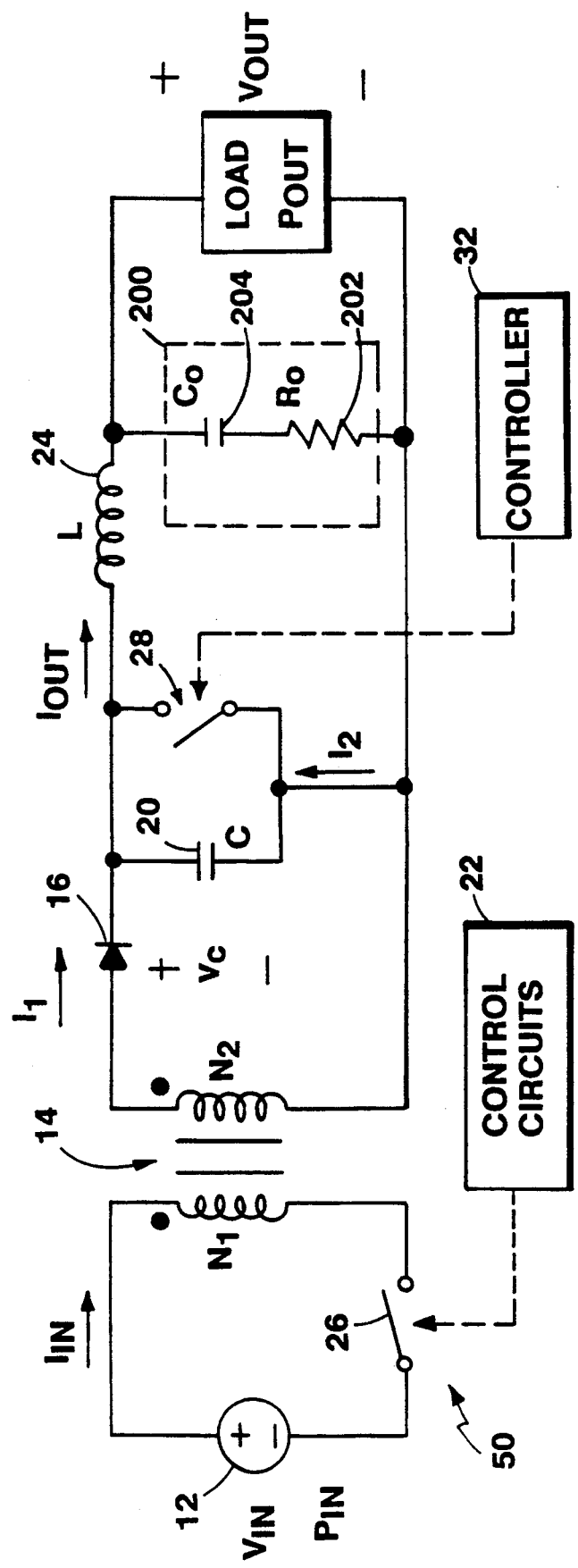
FIG. 2A is a schematic of an embodiment of a zero-current switching forward converter which includes circuits for operating in a reverse boost mode.

Referring to FIG. 2A, in a modified zero-current switching power converter 50 (of the kind described in Vinciarelli, "Zero-Current Switching Forward Power Conversion With Controllable Energy Transfer", U.S. patent application Ser. No. 07/799,675), a second switch 28, capable of bidirectional conduction, is substituted for the second unidirectional conducting device 18 of FIG. 1A. Second switch 28 is cycled on and off by controller 32 which may, with control circuit 22, be part of a single controller. A first unidirectional conducting device 16 and a capacitor 20 are connected in series with the secondary winding of leakage reactance transformer 14. The second switch 28 is connected across the capacitor 20. A second inductor 24 is connected in series between the capacitor 20 and the load. One implementation of a second switch, useful in a converter of the kind shown in FIG. 2, is shown in FIG. 3 and described in Appendix IV. In the equivalent circuit schematic FIG. 2B, the salient characteristics and effects of the leakage reactance transformer of FIG. 2A have been incorporated into a first effective leakage inductance 114 and a transformed input source 112 of approximate value Veq=Vin*(N2/N1), where N2 and N1 are the number of turns on the secondary and primary windings of the leakage reactance transformer 14, respectively.

The present invention relates to an operating mode of the converter of FIG. 2, called the reverse boost mode. In this mode of operation, the second switch 28 is opened at essentially the same time that the first switch 26 is closed and is closed when the capacitor 20 voltage, Vc(t), returns essentially to zero. For relatively high values of converter load (i.e., values of load for which current flow in the second inductor is always in the direction of the load throughout the operating cycle), the second switch performs essentially the same function as the second unidirectional conducting device 18 of FIG. 1 and operation of the converters in FIGS. 1 and 2 are substantially identical. At relatively low values of load, however, where current reversal in the second inductor occurs during an operating cycle, the second switch of the converter of FIG. 2 prevents charging of the capacitor by providing a bypass path for the reverse flow of current. As discussed in Appendix V, which provides a more detailed analysis of reverse boost operation, the primary benefits of the reverse boost mode are: (a) a reduction in the operating frequency range of the converter, and (b) elimination of "discontinuous" operating modes, at low values of loads, associated with cycle-by-cycle differences in the voltage across the capacitor 20 at the initiation of consecutive energy transfer cycles.

One disadvantage of the topology of FIG. 2 results from the fact that the peak value of the reverse current which flows in the second inductor during reverse boost operation will increase as load is decreased. Since, in practice, this current is usually supplied by output filter capacitors connected across the output of the converter in parallel with the load (e.g. capacitor 200, FIG. 2A), the effect will be an increase in the peak-to-peak output voltage ripple of the converter with decreasing load (due, in part, to the integrating effect of the capacitance 204, Co, on the forward and reverse flow of Iout, and in part to the flow of forward and reverse current in the equivalent series resistance 202, Ro, of the output capacitor 200). This ripple voltage may be large enough to adversely affect the output ripple specification of the converter.

In the present invention this effect is reduced by use of the modified circuit shown in FIG. 7. In the circuit shown in FIG. 7 the second switching device 28 of FIG. 2A is replaced with a second unidirectional conducting device 250 connected in parallel with a circuit comprising a second switching device 252 connected in series with a damping resistor 210 of value Rd. As a practical matter, even the very low resistance switching device which would be chosen for reverse boost mode operation would have some small series resistance associated with it. Therefore, for simplicity, the value Rd may be assumed to include this small series resistance associated with a physically realizable second switching device 252. The second unidirectional conducting device 250 is oriented to prevent charging of the capacitor 220 when current in the second inductor 214 is flowing in the direction of the load.

In a damped reverse boost mode, the circuit of FIG. 7 is operated as previously described for the reverse boost mode of the converter of FIG. 2: the second switching device 252 is opened at essentially the same time that the first switch 26 is closed, and is closed at essentially the time at which the voltage across the capacitor 220 declines to zero. At relatively high load currents, current reversal will not occur in the output inductor 214 and operation will be substantially the same as that of the converters of FIGS. 1 or 2. However, as the converter load is reduced a load value will be reached below which current reversal in the output inductor 214 will occur. This reverse current will flow in an output resonant circuit formed by the series connection of the output capacitor 200, the output inductor 214, and the parallel circuit comprising the capacitor 220 in parallel with the series circuit comprising the damping resistor 210 and the second switching device 252.

If Rd were set equal to zero, and Ro (the equivalent series resistance 202 of the output capacitor 200) is small, then operation of the circuit of FIG. 7 would revert to "normal" reverse boost operation, previously described. That is, the second switching device will hold the capacitor voltage at essentially zero volts and reverse current in the inductor and the output capacitor will increase essentially linearly until the first switch is once again closed and the second switch opened. If, however, Rd is not zero, then the effects of Rd will be to: (a) set a limit on the peak value of reverse current and (b) influence the time varying behavior of the flow of the reverse current. For example, if Rd is set to a value Rcd=½*sqrt(Lo/C), the output resonant circuit will be critically damped and the peak reverse current, Iout, will rise smoothly and predictably, without overshoot, toward a value equal to Vo/Rd (again assuming that Ro is small relative to Rd) as the capacitor 220 voltage rises towards a value equal to Vo. If the value of Rd is somewhat less than the critically damped value Rcd (e.g. one half the value of Rcd) then the output resonant circuit will be slightly overdamped and the rise in reverse current will be slowed, but will still be without overshoot. In both the critically damped and overdamped cases the value of capacitor 220 voltage will increase monotonically with time after the second switching device is opened. Since an increase in the capacitor voltage at the beginning of an energy transfer cycle will translate into a reduction in the amount of energy which will be transferred during the cycle, the effect of critical damping or overdamping is a smooth reduction in cycle-by-cycle forward energy transfer with decreasing load. This is in contrast with the operation of the prior art converter (FIG. 1) at low values of load, wherein with an effectively infinite value of Rd, the capacitor voltage in the converter of FIG. 1 will oscillate in response to current reversal in the second inductor, and instead of exhibiting a smooth time variation in capacitor voltage after current reversal, the capacitor voltage will rise and fall with time. Since the same value of capacitor voltage may occur at different times following current reversal, energy transfer per cycle in this "discontinuous" operating mode will become unpredictable on a cycle-by-cycle basis, and thus converter operating frequency will become unpredictable and output ripple and noise will increase.

Referring once again to FIG. 7, if Rd is set to a value somewhat greater than Rcd (e.g. two times the value of Rcd), then the circuit will be slightly underdamped and the rise in reverse current will exhibit a small amount of overshoot as it converges toward a stable final value. Although not as well behaved as the overdamped or critically damped cases, a converter with a slightly underdamped reverse boost response exhibits greatly improved behavior at low values of load in comparison to the behavior of a converter without any damping (and, it should be noted, the converter of FIG. 7 will revert to the "undamped" converter of FIG. 1 as the value of Rd approaches infinity).

In general, improved low load performance may be achieved if the value of Rd is selected so that the response of the converter output resonant circuit to reverse flow of current is approximately critically damped (e.g., Rd might be between one-half and two times the value of Rcd, as previously defined).

FIGS. 8A–D and 9A–D show exemplary simulations which illustrate operation in damped reverse boost mode. For these simulations, circuit values are chosen as follows:

| Veq | 15 V |
|---|---|
| L2e | 30 nH |
| C | .44 uH |
| L | 7.5 uH |
| Co | 400 uF |
| Ro | 12.5 mOhm |
| Vout | 5 V | where L2e is the secondary-referenced equivalent leakage inductance of the leakage inductance transformer 14 of FIG. 7, and Veq is, as noted earlier, approximately equal to Vin*(N2/N1). FIGS. 8A–D show waveforms for Vc (labeled E), Iout (labeled B), and $Vc_o$ (ripple voltage across output capacitor Co, labeled H) at an operating frequency of 50 kHz (corresponding to a lightly loaded converter) for Rd=4 (slightly underdamped reverse boost), 2 (critically damped reverse boost), 1 (slightly overdamped reverse boost), and 0 Ohms ("normal" reverse boost), respectively (the scale factors are indicated at the bottom of each Figure). FIGS. 9A–C show similar waveforms for Vc, Io, and $Vc_o$ at an operating frequency of 200 kHz for values of Rd equal to 4, 2 and 0 ohms, respectively.

In each of FIGS. 8A–D and 9A–C the value in the "VALUE" column for channel 3 (corresponding to the output current) reflects the average output current delivered to the load. The value in the "VALUE" column for channel 4 reflects the power dissipated in the damping resistor Rd.

Figure 8A:
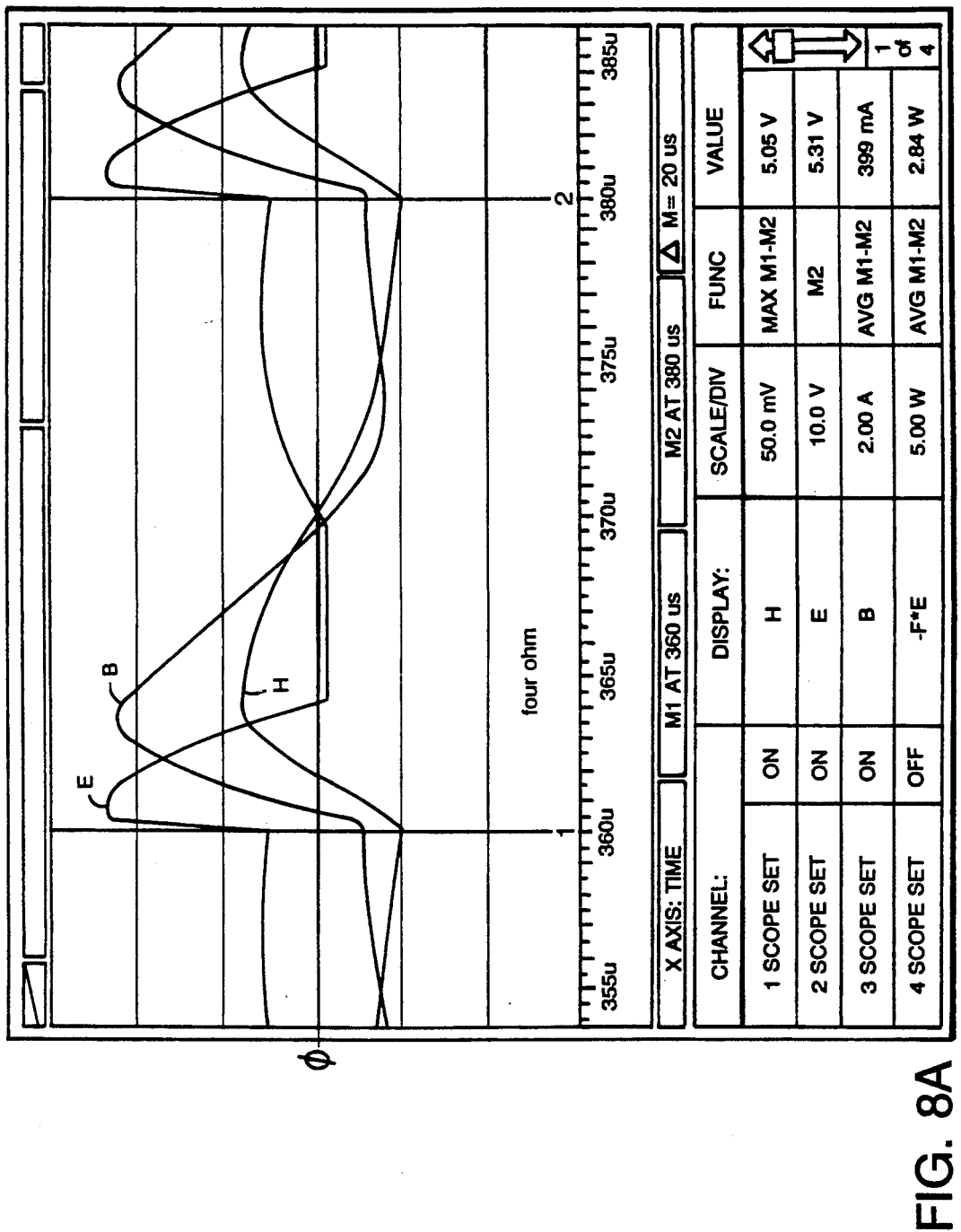
Figure 8B:
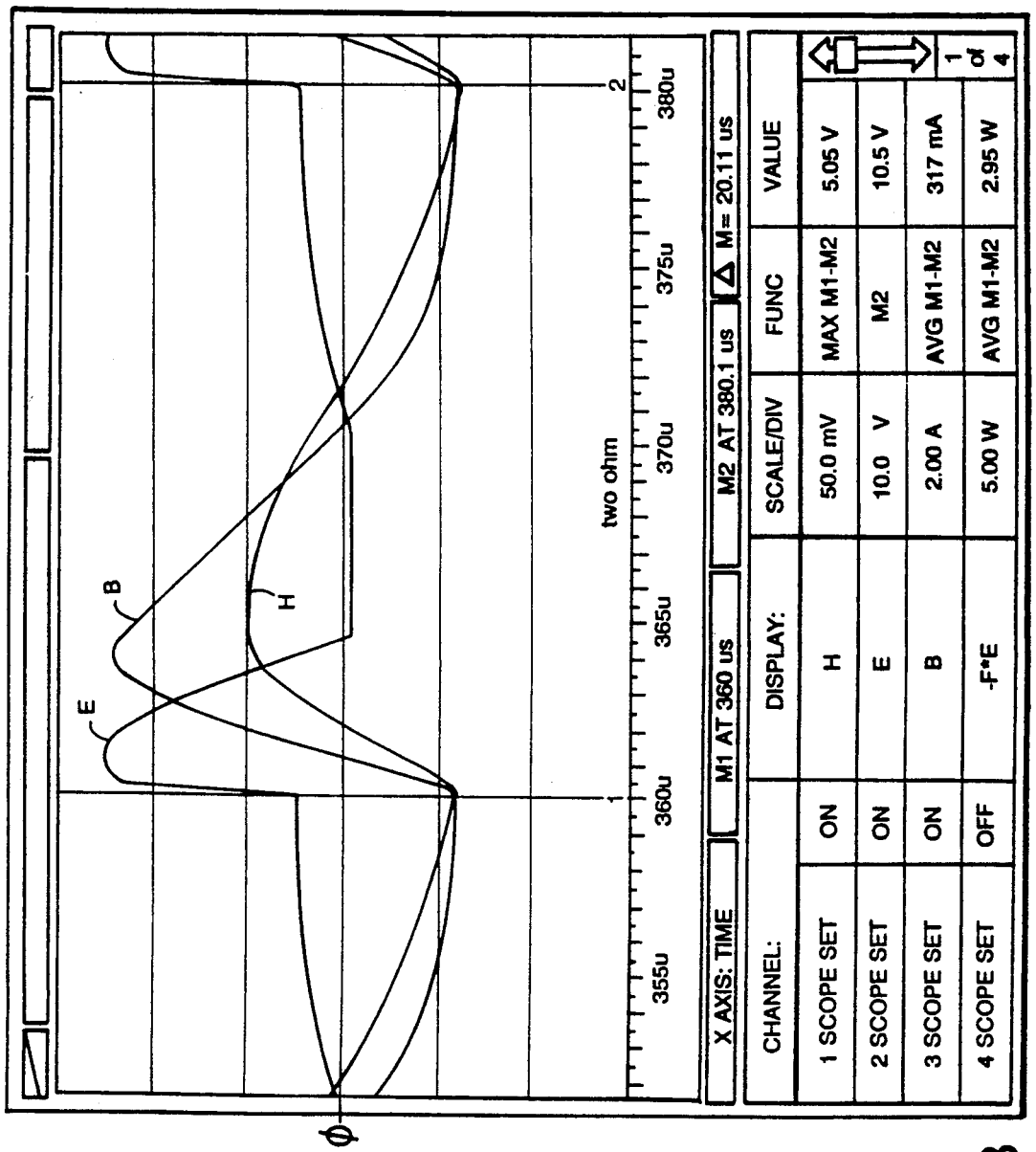
Figure 8C:
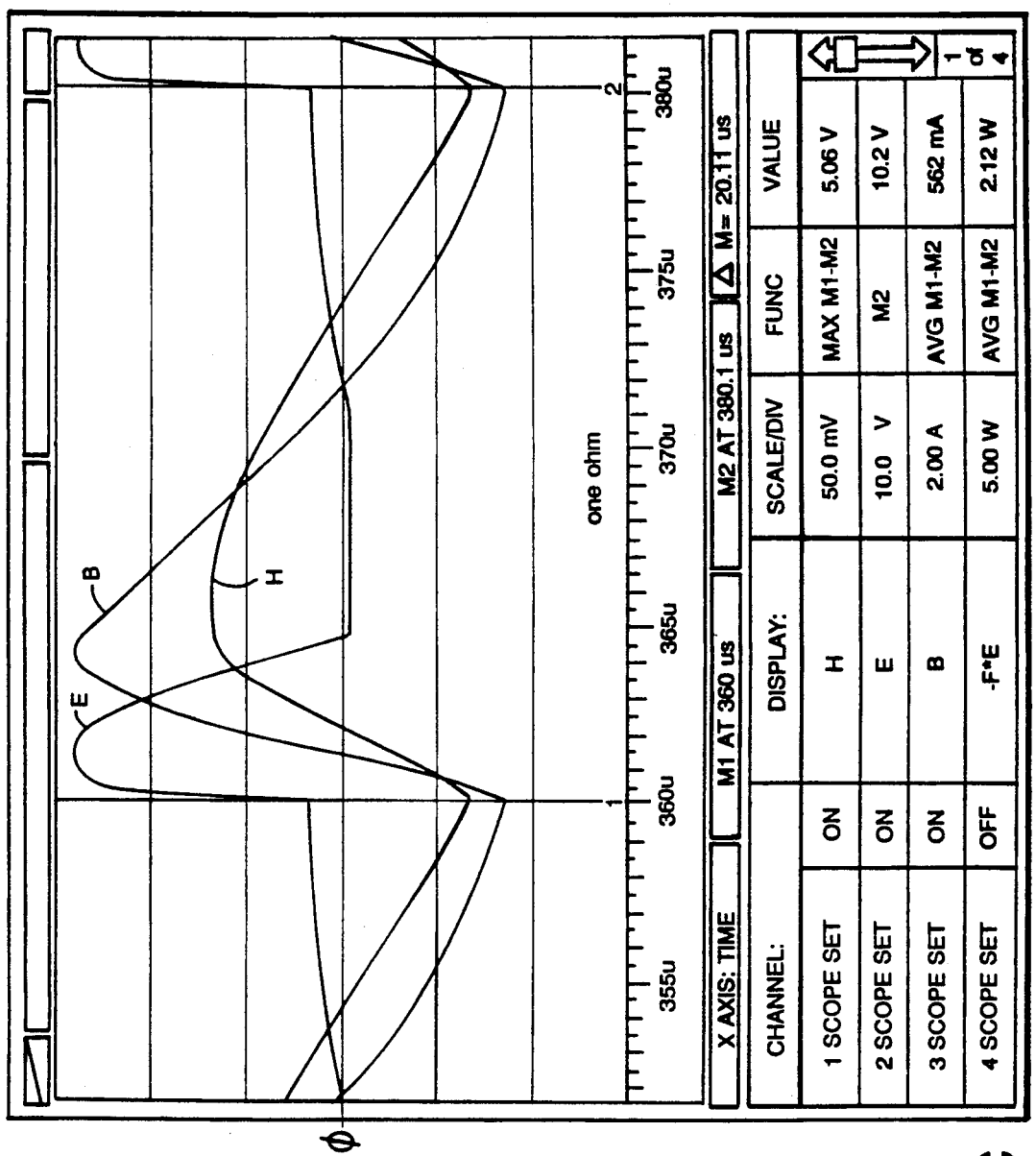
Figure 8D:
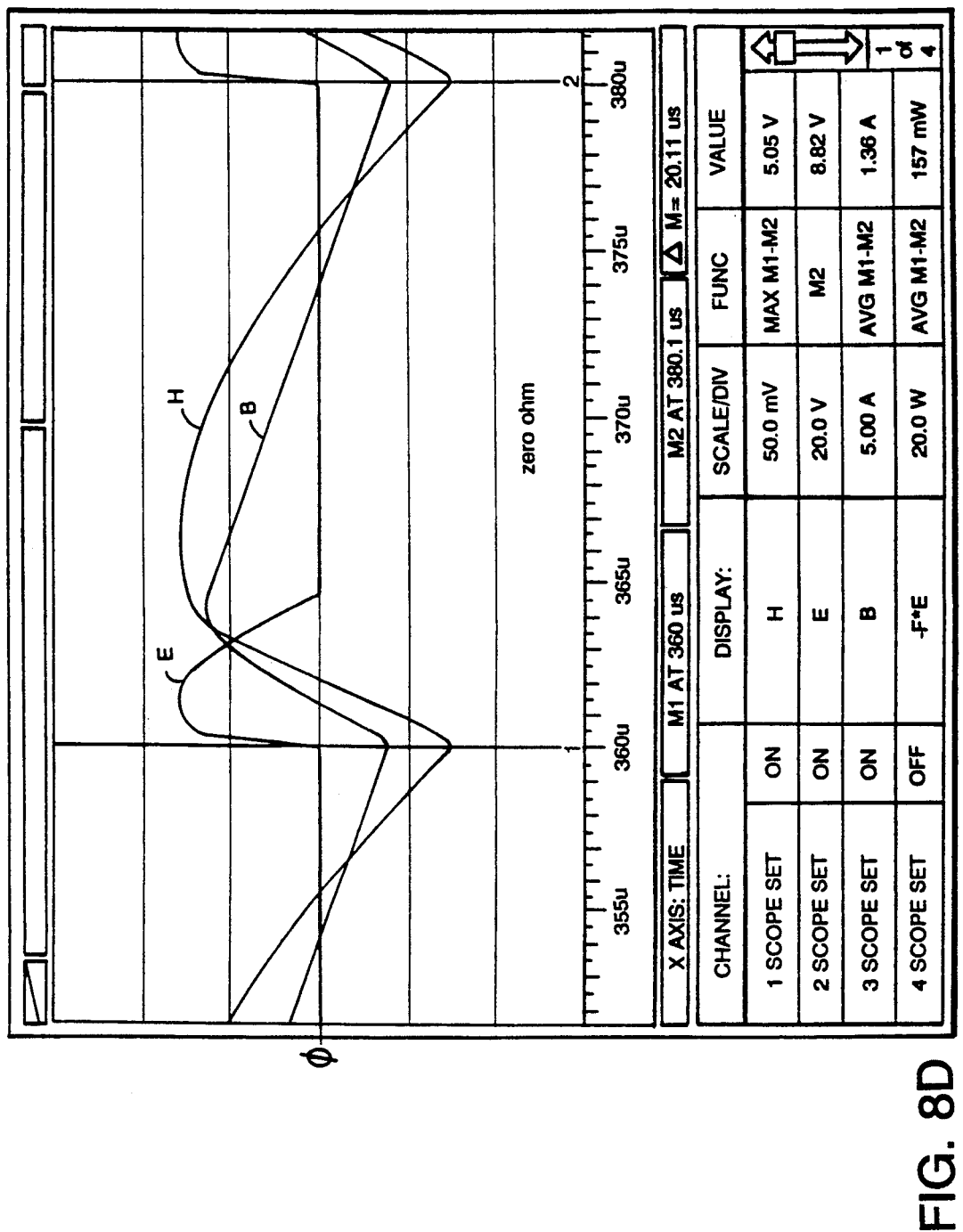
Figure 9A:
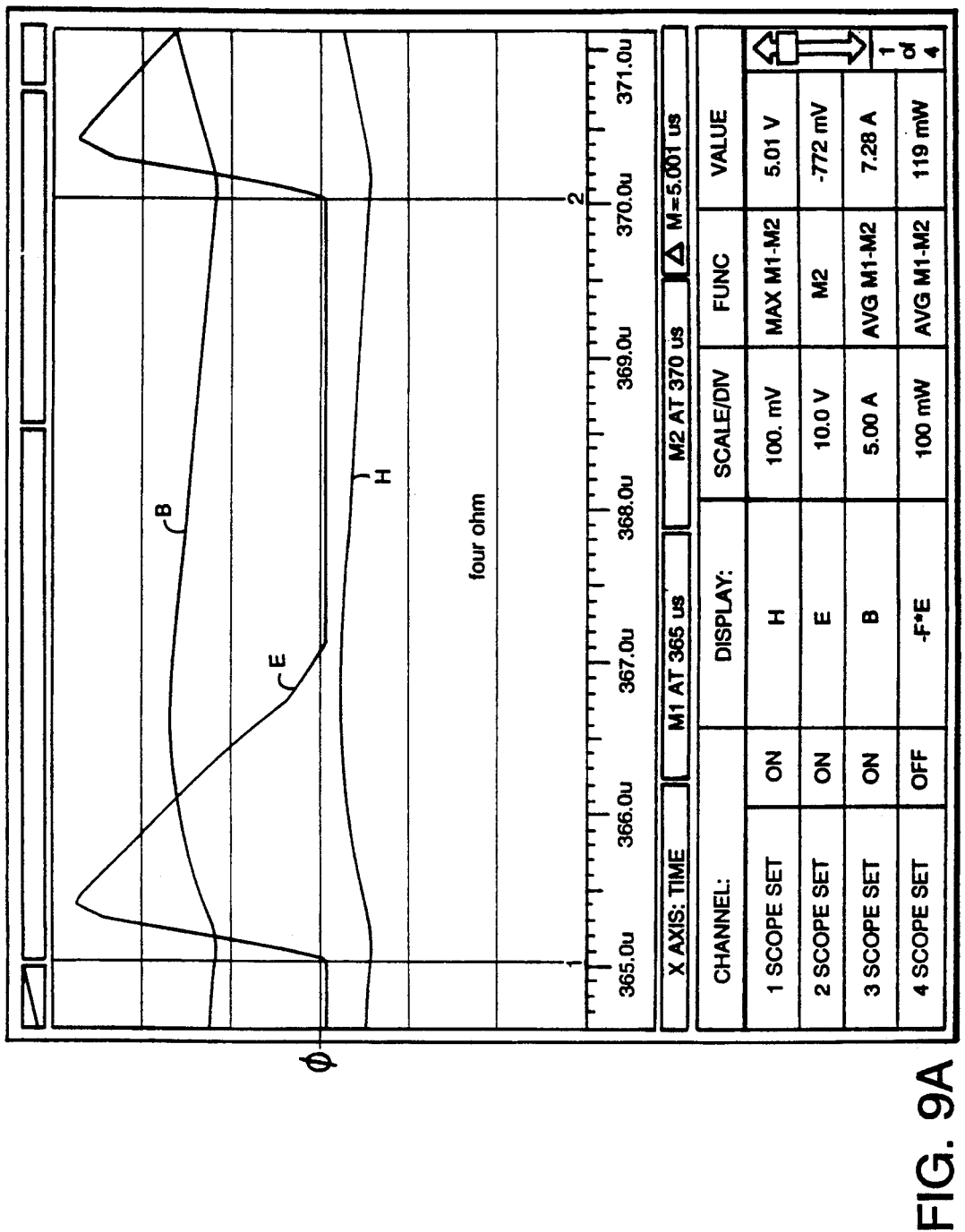
Figure 9B:
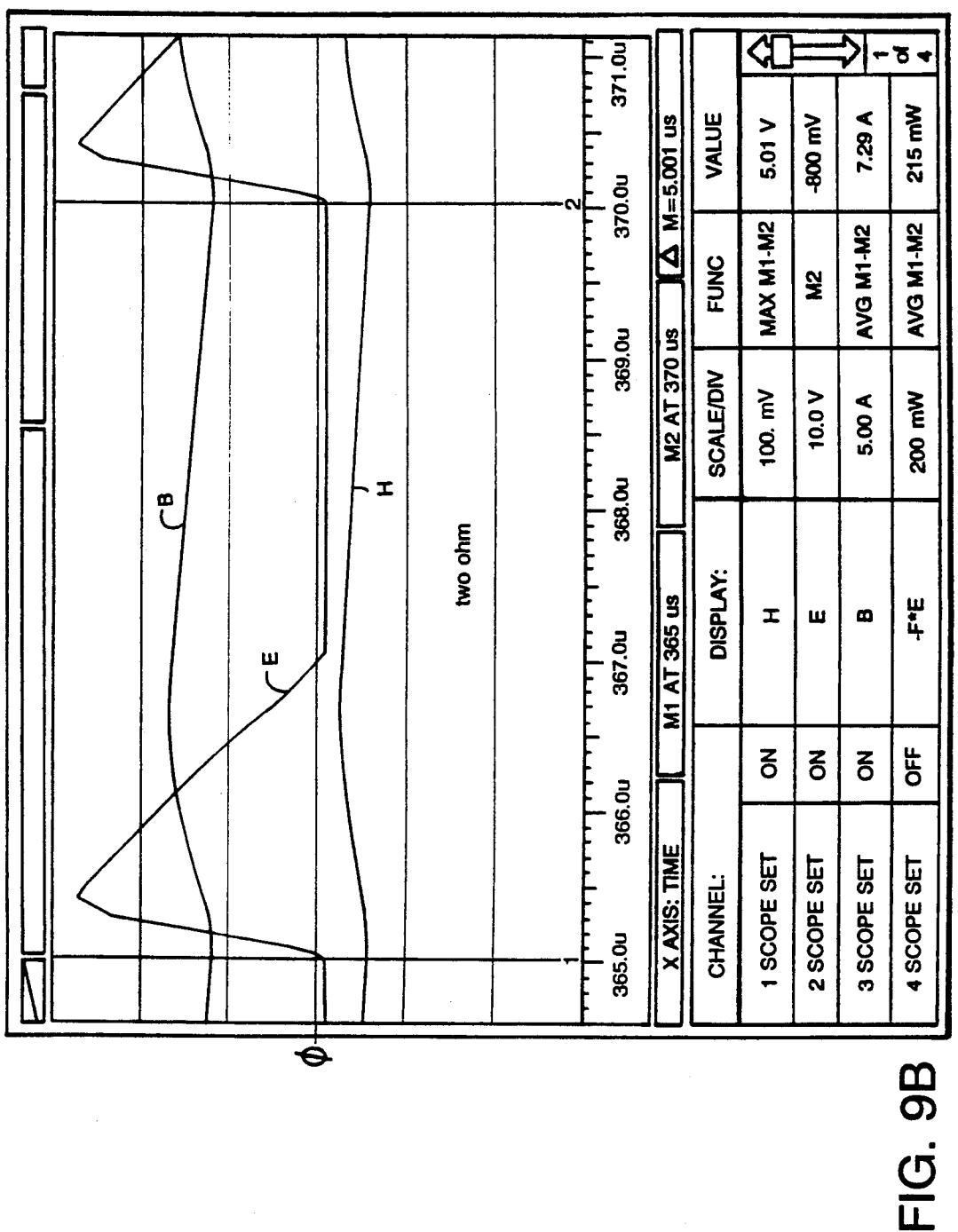
Figure 9C:
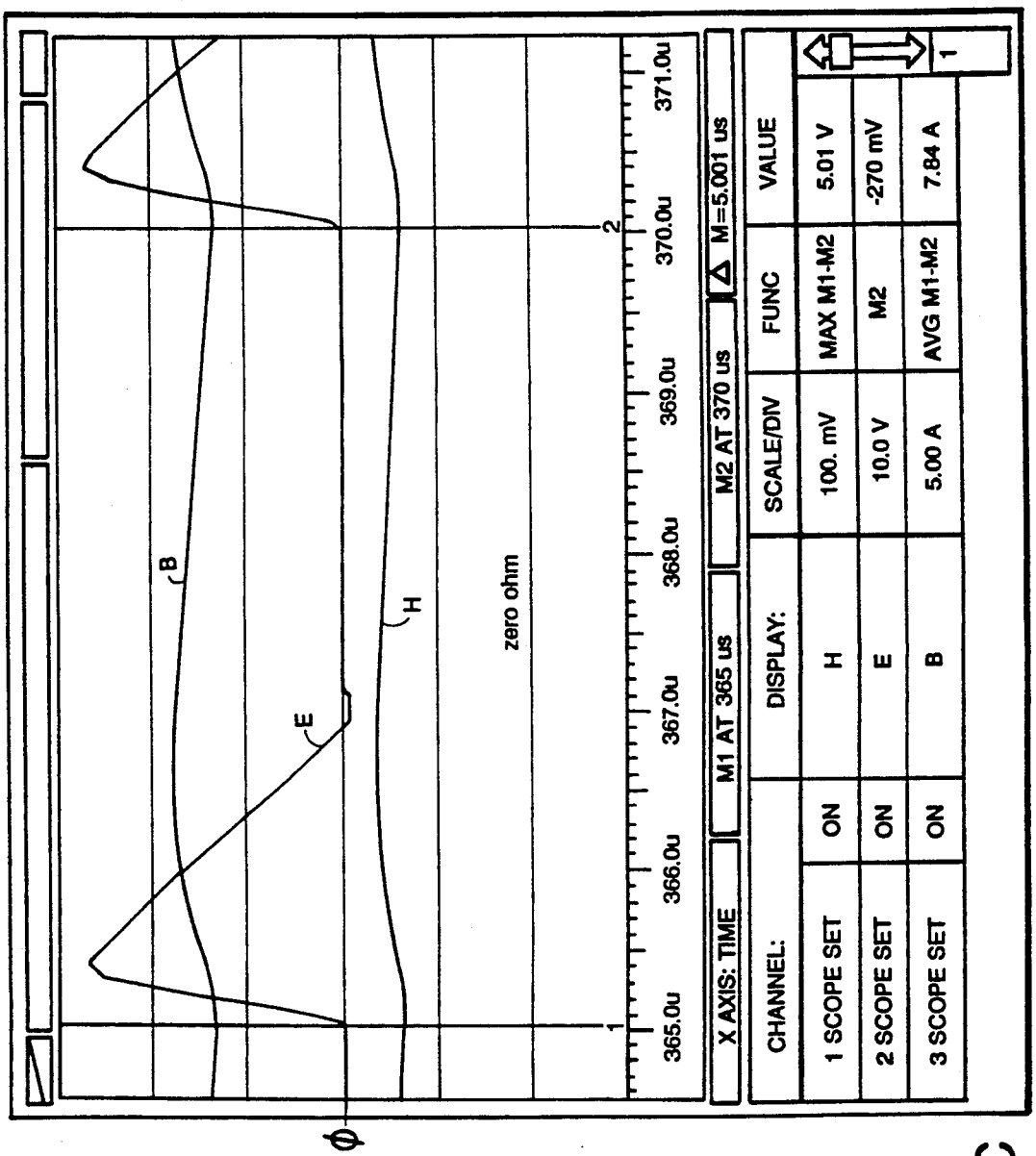

The low-frequency, light load, simulations of FIGS. 8A–D illustrate that the peak-to-peak ripple voltage $Vc_o$ is maximum for the "normal" reverse boost case (FIG. 8D) and is reduced in the slightly underdamped (FIG. 8A), critically damped (FIG. 8B) and slightly overdamped (FIG. 8C) cases. At a fixed frequency of 200 KHz, output current is at a minimum when the system is critically damped, i.e., when Rd=2 Ohms. Therefore, for a given value of relatively light load the critically damped converter will operate at the highest frequency, and hence have the most narrow operating frequency range. On the other hand, at light loads, dissipation in the damping resistor is highest in the critically damped case, causing a trade-off between dissipation and operating frequency range (it is to be noted that the small amount of dissipation shown for the zero ohms case, FIG. 8D, is primarily a result of a small error in fixing the time period over which the dissipation has been calculated).

Generally speaking, it is desirable to choose a value of Rd near the critically damped value such that ripple voltage is reduced to some desired value, or such that minimum operating frequency is raised to some desired value, but where dissipation is not deemed to be excessive. It is to be noted, however, that dissipation in Rd occurs only at relatively low values of load where the loss in Rd is usually more than offset by reduced losses in the remainder of the converter circuitry. As discussed below, at higher loads, where current reversal in the output inductor does not occur, and where overall converter loss associated with increased forward power processing is increased, dissipation in Rd will be reduced essentially to zero.

For the critically damped and slightly overdamped cases (FIGS. 8B and 8C), both the capacitor voltage, Vc (labeled E), and the reverse inductor current, Iout, (labeled B) can be seen to rise smoothly, without overshoot, towards their peak values. The rate of rise of reverse current in the slightly overdamped case (FIG. 8C) is seen to be slower than the rate of rise with critical damping (FIG. 8B). For the slightly underdamped case (FIG. 8A) both Vc and Iout are seen to overshoot slightly as they converge toward final values.

The higher-frequency simulation of FIGS. 9A–D illustrate that the boost switch has essentially no effect at higher frequencies. This is because at higher frequencies the output current Iout never reverses and the bulk of the forward current flowing in the output inductor will be bypassed around the second switching device and damping resistor by the second unidirectional conducting device.

In general, the damping resistor 210 shown in FIG. 7 need not be a fixed resistor, but can be any dissipative element of appropriate value. For example, the damping resistor might be a PTC thermistor (positive temperature coefficient thermistor). Such a device has a relatively stable value of resistance until it reaches a specified operating temperature, at which point its resistance increases sharply. One benefit of using a PTC thermistor is that potentially troublesome side effects of certain faults in arrays of driver and booster (see Vinciarelli, "Power Booster Switching at Zero Current", U.S. Pat. No. 4,468,020, Mar. 3, 1987, incorporated herein by reference) converters which incorporate damped reverse boost may be avoided. For example, short circuiting of a second switching device in a booster converter in such an array will cause the array output voltage to appear across the damping resistor. The loading effect of, and dissipation in, the resistor could be reduced if the resistive element were a PTC, since the PTC can be selected to rise in resistance under such a fault condition.

Although not seen in FIG. 7, other features shown in other Figures and discussed in the Appendices may be combined with the circuit of FIG. 7. For example, as illustrated in FIG. 10, the second switching device 252 of FIG. 7 might be a unidirectional switch (e.g. a field effect transistor 260, as illustrated in the FIG. 10A, or a bipolar transistor 270, as shown in FIG. 10B). The unidirectional switch 260, 270 would be oriented relative to the second unidirectional conducting device 250 so that they would respectively conduct current in opposite directions.

There are a great many ways of implementing means for controlling the opening and closing of the second switching device of FIG. 7 in a damped reverse boost mode. One such controller 508 is shown schematically in FIG. 11. In FIG. 11 control circuits 22 turn the first switch 526 on and off, at times of zero current, at an operating frequency consistent with maintaining the output voltage of the converter at an essentially fixed value Vo. The first switch, which, in the Figure, is shown to be a field effect transistor, is turned on and off via a coupling transformer 500 and gate interface circuitry 505. The first switch is turned on when the control circuits send a first signal (e.g. a positive going edge) to the primary winding 502 of the coupling transformer 500. The interface circuits 505 sense this signal via secondary winding 504 and turn on the first switch. By means of the third winding on the coupling transformer 506 the turn-on signal is also routed to a first comparator 510, included in controller circuitry 508, which delivers a high-going signal to gate 514 when it senses the presence of the turn-on signal.

Just prior to the first switch being turned on we note that the second switching device is turned on by the Q output of the flip-flop 516. Also, the capacitor 220 voltage, Vc, is either essentially zero (at relatively high values of load) or is above zero (at relatively light loads). Second comparator 512 is arranged to deliver a high-going output to gate 514 when the capacitor voltage is at a value essentially equal to zero volts. The gate 514 output will go high when the second comparator output goes high, provided that the output of the first comparator is not high (as indicated by the circular negation symbol at the input of the gate which is connected to the output of the first comparator). The Q output of the flip-flop will go high, and turn the second switching device on, when the S input to the flip-flop is driven momentarily high; it will go low, turning the second switching device off, when the R input to the flip-flop is driven momentarily high. Therefore, when the control circuits deliver a turn-on signal to the first switch 526, and the output of the first comparator goes high, the R input of the flip-flop will be driven high and the S input will be driven low, causing the second switching device to be turned off. In the event that the signal delivered by the first comparator 510 lasts only momentarily, and the converter is running at a relatively high value of load, there may a short delay between the first switch being closed and the capacitor voltage rising above zero volts. This will cause a short delay between the output of the first comparator going high and the output of the second comparator going low. This delay is masked by the delay circuit 515, which holds the S input of the flip-flop low for a fixed, relatively short, period of time after the output of the gate 514 goes low. The second switching device will remain off until some time later in the converter operating cycle when the capacitor voltage returns to zero. At this time, the output of the second comparator 512 will go high, the output of the first comparator 510 will be low, and the S input of the flip-flop will be driven high, once again turning the second switching device on.

There are also a great many ways of implementing the control circuits (e.g. control circuits 22, FIGS. 7 and 11) for opening and closing the first switching device at zero current and controlling the rate at which the switch is opened and closed as a means of maintaining the converter output voltage, Vout, at some desired setpoint value. Details of one means of implementing such control circuits are illustrated in FIG. 12, which shows a portion of a zero-current switching converter consisting of switch controller 441, a first switching device 440, a current transformer 400 connected in series with the first switching device 440, an error amplifier 490, a variable frequency pulse generator 500, and a voltage divider 495. A fraction of the converter output voltage, $V1 = K \cdot Vout$, is supplied to an input of the error amplifier 490 by the voltage divider 495. A reference voltage, Vref, indicative of some desired value of converter output voltage, is delivered to the other input of the error amplifier. If the signal V1 is greater than Vref, the output of the error amplifier will decrease; if the signal V1 is less than Vref, the output of the error amplifier will increase. The output of the error amplifier is delivered to a variable frequency pulse generator 497. As the error amplifier output increases, the frequency of the pulse train signal, Vf, delivered to the switch controller 441, will increase, thereby increasing the rate at which converter operating cycles are initiated (i.e. increasing the converter operating frequency). In this way, the converter operating frequency will automatically be adjusted so as to maintain $Vout = Vref/K$ as both the converter load and input voltage vary. The pulses delivered by the pulse generator 497 are delivered to the S input of the flip-flop 470. The output of the flip-flop, VQ, goes high when a high signal is applied to the S input and goes low when a high signal is applied to the R input. Thus, each time a pulse is delivered to the S input, the signal VQ goes high. The signal VQ is delivered to a switch driver 410 which closes the first switching device 440 when VQ is high. The switch driver might include the transformer 500 and gate interface circuitry 505 of FIG. 11. Upon closure of the first switch, switch current, Isw, begins to rise and fall, reflecting the rise and fall of current in the leakage reactance transformer secondary winding (not shown in the Figure). By action of the current transformer 400, a fraction of this current flows in the signal diode 430 connected to the secondary of the current transformer 400 (the turns ratio, N2/N1, being greater than one). The diode voltage, VI, is delivered to one input of the comparator 480. A threshold voltage, Vt (fr example, 0.1 V), is delivered to the other input of the comparator. As VI rises above Vt the comparator output goes to its low state. As the switch current, Isw, returns to zero, at time t2, the current in the diode also decreases and the voltage VI drops below Vt. This causes the output of the comparator 480 to return to its high state and, via the capacitor 450 and the resistor 460, causes a high going pulse, VR, to be delivered to the R input of the flip-flop 470. This pulse resets the flip-flop, VQ goes low and the switch 440 is turned off. As described, the switch controller 441 of FIG. 12 is arranged so that it opens the switch at essentially the first instant in time, following the time when the switch is turned on, when the current returns to zero.

Other embodiments are within the claims which follow the appendices.

Appendix I

In FIG. 1, conservation of power requires that:

Pin = Pout + Heat Losses so,

Pin ≧ Pout i.e, $$Veq * I1 \geq Vout * Iout \qquad (1)$$

where I1 and Iout are the average currents flowing in first unidirectional conducting device 16 and the second inductor 24, respectively. Iout is the sum, or mixture, of the two currents I1 and I2:

$$\text{Iout} = \text{I1} + \text{I2} \tag{2}$$

The presence of the second unidirectional conducting device 18 constrains the average value of I2 to positive values which flow in the direction of conduction of the second unidirectional conducting device 18. Since both I1 and I2 are constrained to be positive then equation 2 requires:

$$\text{Iout}/\text{I1} \geq 1 \tag{3}$$

Since, from Equation 1:

$$\text{Veq} \geq \text{Vout} \cdot \text{Iout}/\text{I1}$$

then $$\text{Veq} \geq \text{Vout}.$$

Figure 1B:
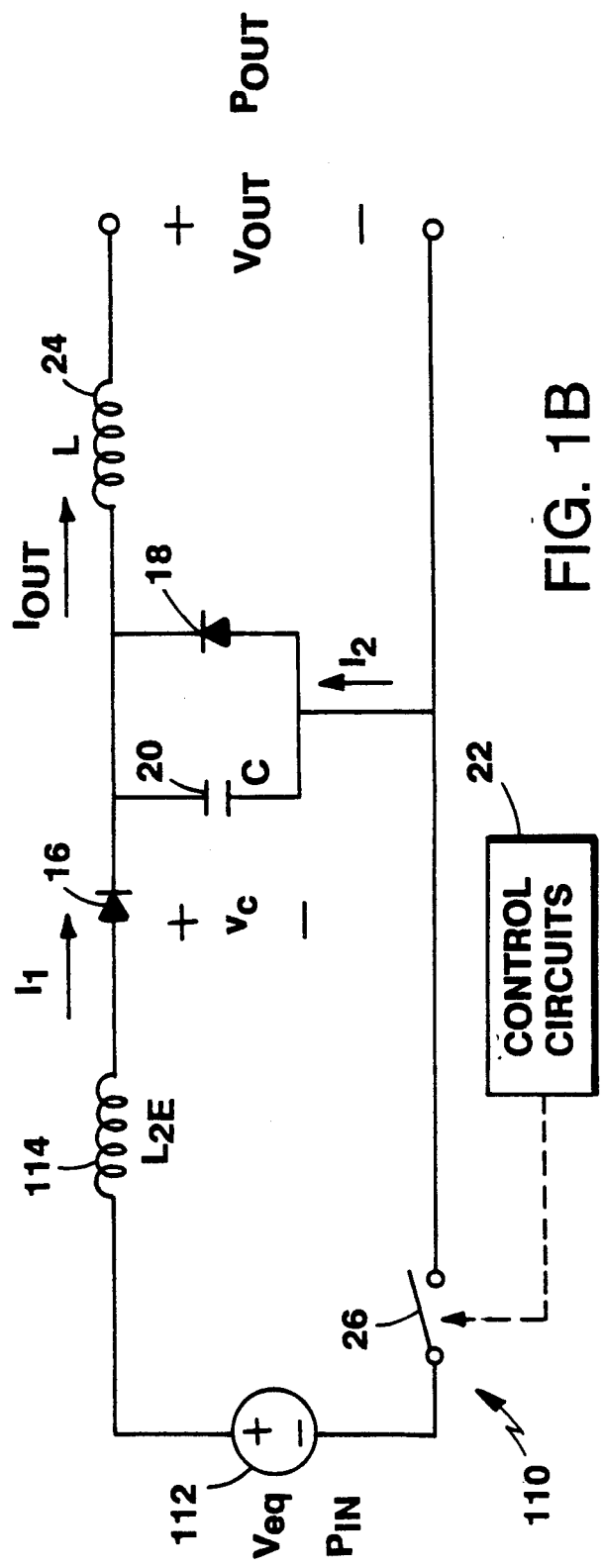
FIG. 1B is an equivalent circuit of the converter of FIG. 1A.

In the topology of FIG. 1B, by constraining the average current I2 to a range of positive values only, the behavior of the second unidirectional conducting device 18 forces the converter to operate in a "buck" mode.

Appendix II

Upon initiation of a cycle in the converter of FIG. 1A, closure of the first switching device 26 impresses the transformed input source voltage Veq across the effective inductance 114, whose initial instantaneous current, I1, is zero. A positive ramp of current I1 will flow in the effective inductance 114 until the current in the second unidirectional conducting device 18 (i.e., the difference between the instantaneous current in the effective inductance 114 and the instantaneous current in the second inductor 24, Iout), becomes zero, at which time the second unidirectional conducting device 18 ceases conducting. Once the second unidirectional conducting device 18 ceases conducting, energy transfer from the transformed input source via the effective inductance 114 to the capacitor 20 and load commences. It can be shown that during this energy transfer cycle the voltage across the capacitor 20 will be:

$$v_c(t) = L_p \cdot \left[ \frac{V_{eq}}{L_{2e}} + \frac{V_{out}}{L} \right] \cdot \left[ 1 - \cos\left[ 2 \cdot \frac{\pi}{T_1} t \right] \right] + \frac{2 \cdot \pi \cdot L_p}{T_1} [I_p - I_o] \cdot \sin\left[ 2 \cdot \frac{\pi}{T_1} \cdot t \right] \tag{4}$$

and the current in the effective inductance 114 is:

$$I_1(t) = I_p + [I_o - I_p] \cdot \frac{L}{L_s} \cdot \left[ 1 - \cos\left[ 2 \cdot \frac{\pi}{T_1} t \right] \right] + \frac{L \cdot T_1}{2 \cdot \pi \cdot L_s} \left[ \frac{V_{eq}}{L_{2e}} + \frac{V_{out}}{L} \right] \cdot \sin\left[ 2 \cdot \frac{\pi}{T_1} t \right] + \frac{V_{eq} - V_{out}}{L_s} t \tag{4a}$$

where:
Ip is the instantaneous value of the current, I1, which is flowing in the effective inductance 114, of value L2e, in a positive direction towards the capacitor 20, at the instant that the second unidirectional conducting device 18 ceases conduction; Io is the instantaneous value of the current, Iout, which is flowing in the second inductor 24, of value L, in a positive direction towards the load, at the instant that the second unidirectional conducting device 18 ceases conduction; Ls is the sum of the inductance values of the effective inductance 114 and the second inductor 24, i.e., $$L_s = L_{2e} + L;$$

Lp is the "paralleled" value of the inductance values of the effective inductance 114 and the second inductor 24, i.e., $$L_p = L_{2e} \cdot L/(L_{2e} + L); \text{ and}$$

T1 is the period of the effective LC circuit which results from the combination of the capacitor 20 and the "paralleled" value of inductance, Lp:

$$T_1 = 2\pi \sqrt{L_p \cdot C}$$

The half period, T1/2, defines a characteristic time scale for the rise and fall of currents during the energy transfer cycle:

$$T_1/2 = \pi \sqrt{L_p \cdot C}$$

For the prior art converter, the second unidirectional conducting device 18 ceases conducting when the values of I1 and Iout are equal. Thus, the values of Ip and Io are also equal, and Equations 4 and 4a reduce to:

$$v_c(t) = L_p \cdot \left[ \frac{V_{eq}}{L_{2e}} + \frac{V_{out}}{L} \right] \cdot \left[ 1 - \cos\left[ 2 \cdot \frac{\pi}{T_1} t \right] \right] \tag{5}$$

$$I_1(t) = I_o + \frac{L \cdot T_1}{2 \cdot \pi \cdot L_s} \left[ \frac{V_{eq}}{L_{2e}} + \frac{V_{out}}{L} \right] \cdot \sin\left[ 2 \cdot \frac{\pi}{T_1} t \right] + \frac{V_{eq} - V_{out}}{L_s} t \tag{5a}$$

For the prior art converter, controlled periodic forward energy flow depends upon the presence of a current sinking load across the capacitor 20. This demands that the value of the second inductor 24, L, be very large in comparison with the value of the effective inductance 114, L2e. Using the approximation that the ratio of L to L2e approaches infinity, Equations 5 and 5a may be further reduced to:

$$v_c(t) = V_{eq} \cdot \left[ 1 - \cos\left[ 2 \cdot \frac{\pi}{T_o} t \right] \right] \tag{6}$$

$$I_1(t) = I_o + V_{eq} \cdot \frac{T_o}{2 \cdot \pi \cdot L_{2e}} \cdot \sin\left[ 2 \cdot \frac{\pi}{T_o} \cdot t \right] \tag{6a}$$

the characteristic time scale $$T_o/2 = \pi \sqrt{L_{2e} \cdot C} .$$

Equations 5 and 6 both indicate that the peak voltage on the capacitor is dependent only on the value of the transformed input source voltage Veq, and is independent of Io. Since energy transfer per cycle, E, is first order dependent on the peak energy transferred to the capacitor during a cycle:

$$E = \frac{1}{2} \cdot C \cdot V^2 \tag{7}$$

varying output power requires varying the operating frequency of the converter.

Appendix III

The second unidirectional conducting device 18 prevents energy stored in the second inductor 24 from being transferred to the capacitor during the last phase of the converter operating cycle when the capacitor voltage is zero and positive current Iout flows in the second inductor 24. Stated another way, the second unidirectional conducting device 18 prevents energy transfer to the capacitor 20 so long as the second inductor 24 is transferring energy to the load. However, below some value of load, current reversal in the second inductor cannot be prevented. Once the voltage across the capacitor 20 reaches zero at the end of the energy transfer cycle, the reverse voltage across the second inductor 24 will be equal to the load voltage, and the current in the second inductor 24 will decay at a fixed rate independent of load:

$$dIout/dt = -Vout/L. \tag{8}$$

Since operating frequency drops as Pout drops, for any finite value of L there will be some value of Pout (i.e., Iout) below which reversed current flow in the second inductor 24 cannot be prevented. Once this occurs, energy flowing back from the load (i.., from energy storing elements at the load, such as filter capacitors) into capacitor 20 will asynchronously interfere with periodic forward energy transfer and exhibit itself as increased converter output noise. While relatively larger values of second inductance will limit the onset of this "discontinuous model" to lower values of load, other considerations mitigate against too large a value (i.e., power density, efficiency, and closed-loop bandwidth).

Appendix IV

As a practical matter, typical commercially available single switching devices cannot efficiently perform the function of the bidirectional second switch 28, in FIG. 2, at the high operating frequencies at which the converter will operate. An alternate embodiment replaces the second switch 28, of FIG. 2, with the circuit arrangement of FIG. 3. The circuit is comprised of a second unidirectional conducting device 50 connected across a unidirectional switch 52, such that the preferred directions of conduction of the two devices are in opposition (as indicated by the arrows adjacent to the two devices). The unidirectional switch 52 might be a bipolar or a MOSFET transistor.

Appendix V

Figure 4A:
Figure 4B:
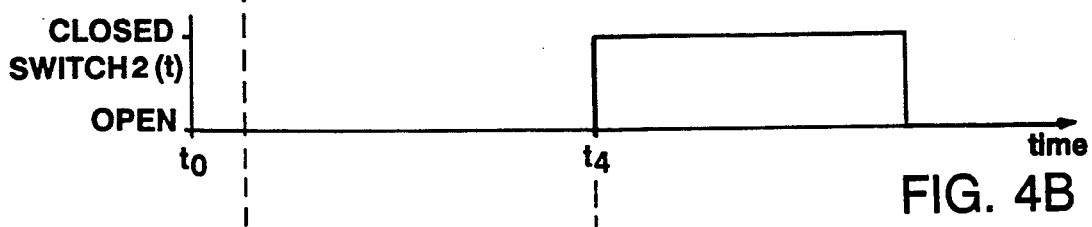
Figure 4C:
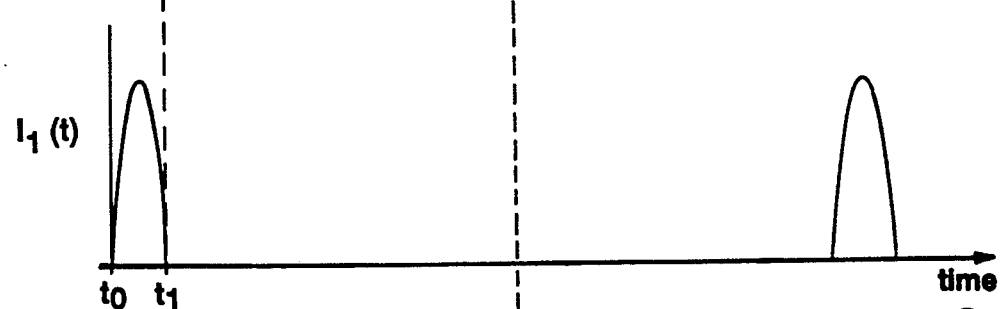
Figure 4D:
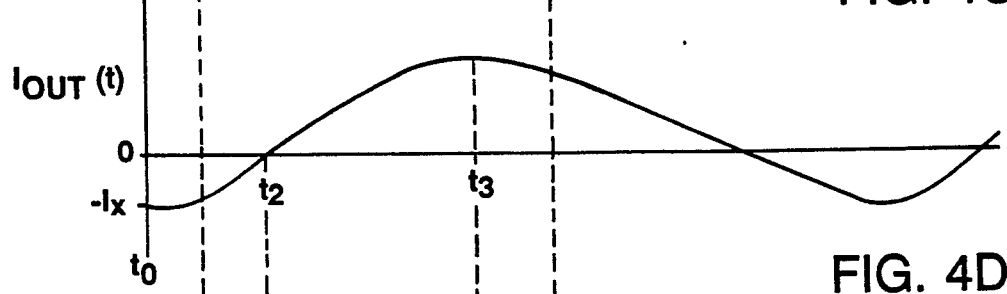
Figure 4E:
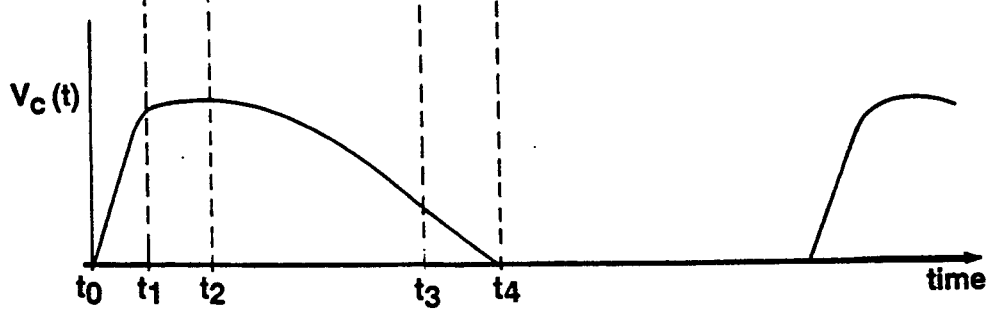

In FIGS. 4A and 4B, the cycling of the switches in the converter of FIGS. 2A-B is shown taking place simultaneously at time t0, resulting in immediate initiation of energy transfer from the transformed input source 112 to the capacitor 20, as shown in FIG. 4C. The capacitor voltage during the forward energy transfer phase will be given by Equation 4, with the initial value of current Ip equal to zero, and the initial value of current Io equal to −Ix. Thus:

$$v_c(t) = L_p \cdot \left[ \frac{V_{eq}}{L_{2e}} + \frac{V_{out}}{L} \right] \cdot \left[ 1 - \cos\left[ 2 \cdot \frac{\pi}{T_1} t \right] \right] + \tag{9}$$

$$I_x \cdot 2 \cdot \pi \cdot \frac{L_p}{T_1} \sin\left[ 2 \cdot \frac{\pi}{T_1} t \right]$$

Using procedures known to one skilled in the art, the current flowing in the effective inductance 114 during the forward energy transfer phase can be shown to be:

$$I_1(t) = L \cdot \frac{T_1}{2 \cdot \pi \cdot L_s} \left[ \frac{V_{eq}}{L_{2e}} + \frac{V_{out}}{L} \right] \cdot \sin\left[ 2 \cdot \frac{\pi}{T_1} t \right] - \tag{10}$$

$$I_x \cdot \frac{L}{L_s} \left[ 1 - \cos\left[ 2 \cdot \frac{\pi}{T_1} t \right] \right] + \frac{V_{eq} - V_{out}}{L_s} t$$

Examination of Equation 10 reveals that both the peak value of Il(t), and the time duration during which Il(t) is positive (i.e., the time period t0 to t1), are strongly dependent on the value, Ix, of negative current Iout which is flowing at time t0. This is to be expected, since, after opening the second switch 28, the negative current Ix starts to positively charge the capacitor 20. Positive voltage buildup on the capacitor 20, in response to the negative current Ix, acts to reduce the voltage across the effective inductance 114 during the energy transfer phase, thereby acting as a barrier to current flow and reducing forward energy transfer. Neglecting the term which is first-order dependent on t, Equation 10 may be rewritten as:

$$I_1(t) = I_f \cdot \sin\left[ 2 \cdot \frac{\pi}{T_1} t \right] + I_r \cdot \left[ 1 - \cos\left[ 2 \cdot \frac{\pi}{T_1} t \right] \right] \tag{11}$$

$$I_f = L \cdot \frac{T_1}{2 \cdot \pi \cdot L_s} \cdot \left[ \frac{V_{eq}}{L_{2e}} + \frac{V_{out}}{L} \right] \tag{12}$$

$$I_r = I_x * (L/L_s) \tag{13}$$

If is the peak value of forward current, Il(t), which would be reached if the initial current, Ix, in the second inductor 24 were zero at the start of a cycle. As shown in Equations 10 and 12, If is dependent only on the values of fixed circuit elements, and the input and output voltages, and is independent of load. Also referring back to Equation 5a, If is the same as the value of peak current which would flow in the effective inductance 114 of a prior art converter 110 if an energy transfer cycle were started with an initial value of current, Io, equal to zero in the effective inductance 114. Ir, in Equation 11, accounts for the effect of the load-dependent negative value of reverse current, Ix, in the second inductor 24, at time t0. FIG. 5 shows waveforms of the forward current, Il(t), of Equation 11, for different values of the ratio Ir/If. In accordance with Equations 5a and 11, the waveform for Ir/If=0 would be the same for both a prior art converter (FIGS. 1A-B) and the converter of FIGS. 2A-B if values of circuit elements were equal and an energy transfer cycle were started when the instantaneous value of output current, Iout, were zero in both. The effect of increasing the ratio Ir/If (i.e., increasing Ix) is illustrated to be a sharp decrease in both the peak value and the time duration of the forward current flow, Il(t). Mathematical integration of Equation 11, over the time period during which positive current flows, results in a value for the amount of charge transferred per cycle, Q. FIG. 6 shows the effect of reverse current, Ix, on forward charge transferred per cycle for a converter operating in reverse boost mode.

FIGS. 5 and 6 illustrate the effect that initial reverse current flow in the second inductor 24 has upon forward energy transfer per cycle. By providing a reverse boost of energy from the load to the capacitor 20, the effect of initial reverse current flow in the second inductor 24 is a reduction in forward energy transferred during the cycle. Since Ix will become more negative as the average value of load current, Iout, drops, the amount of charge transferred per cycle will also drop. The result is that, for a given value of load, and all other circuit elements being equal in value, a converter operating in reverse boost mode must operate at a higher frequency than a prior art converter.

In FIG. 4, at time t1, current in the effective inductance 114 of FIG. 2B returns to zero and the first switch is turned off. A bidirectional energy transfer cycle now occurs during the time interval t1 to t4, with both the capacitor 20 voltage and the current in the second inductor 24, rising and falling in accordance with a characteristic time scale, T2/2, defined by the capacitance C of capacitor 20 and the inductance L of second inductor 24

$$(T2/2 = \pi \sqrt{L \cdot C}).$$

Between time t1 and t2, Iout remains negative and energy continues to be transferred from the load to the capacitor 20, with the capacitor 20 voltage peaking at time t2 as Iout passes through zero. Between t2 and t4 energy from the capacitor 20 is returned to the load, with Iout peaking at time t3 when the capacitor 20 voltage is equal to the load voltage, Vout. At time t4, the capacitor voltage returns to zero, and the second switch 28 is closed, preventing energy transfer from occurring between the second inductor 24 and the capacitor 20. From time t4 until the initiation of the next cycle, current Iout will ramp down linearly in accordance with Equation 8.

When operated in reverse boost mode, the converter of FIGS. 2A-B can operate down to no load without the deleterious effects of "discontinuous" mode. By allowing for reverse current flow in the second inductor 24, while simultaneously asserting control over the amount of forward energy transferred, reverse boost eliminates the source of discontinuous mode while at the same time reducing the relative range of frequencies over which the converter will operate as load is decreased. Clearly, reducing the inductance value of the second inductor 24 is not only made possible by reverse boost, it is required to ensure that current reversal will occur at light loads.

It is informative to compare the performance of a prior art converter 10 with a converter operating in reverse boost mode. Both converters are implemented using identical leakage reactance transformers 14 and capacitors 20, and both are configured to maintain a regulated output voltage, Vout, of 5 volts. Performance comparisons are made with both converters operating with a transformed input source voltage, Veq, of 6.5 volts. The value of the equivalent leakage inductance, referenced to the secondary (L2e in FIGS. 1B and 2B), is 37 nanohenries in each converter, and the capacitor 20 is a standard low-loss polypropylene device having a value of 0.44 microfarads. Both converters utilize standard Schottky power diodes for the first unidirectional conducting device 16. The second switching device 28 in the converter is implemented using the topology of FIG. 3. A MOSFET transistor with an on-resistance o( approximately 30 milliohms is used for switch 52, and a Schottky diode is used for the unidirectional conducting device 50. In the prior art converter 10, the value, L, of the second inductor 24 is 10 microhenries, while in the converter operating in reverse boost mode, the inductance value is reduced to 3 microhenries.

In the prior art converter, current reversal in the second inductor 24 starts to appear at an operating frequency of about 140 Kilohertz, as the average output load current is reduced to a value of about 1 Ampere. This is predictable, since, following the end of the energy transfer interval, the value of the current Iout will rise and fall in accordance with the characteristic time scale $$\text{Tout}/2 = \pi \sqrt{L \cdot C} .$$

If the time period between the end of an energy transfer interval and the start of the next operating cycle exceeds the characteristic time scale Tout/2, then the current in the second inductor at the start of the next operating cycle will be less than its value at the end of the preceding energy transfer interval. Since at light loads the instantaneous value of current, Iout, following in the second inductor 24 at the end of the energy transfer interval is small, current reversal may be anticipated to occur at a converter operating period equal to the sum of the period of the energy transfer interval (in this case 0.4 microseconds) and the characteristic time scale Tout/2 (in this case, 6.6 microseconds). In this case, the anticipated converter operating period at which current reversal will occur is 7 microseconds, corresponding to an operating frequency of 142.8 Kilohertz. Lacking a mechanism for bypassing the flow of the reverse current around the capacitor 20, energy is transferred to the capacitor 20 resulting in a positive voltage appearing across the capacitor at the start of the next energy transfer cycle. The presence of a positive voltage across the capacitor 20 at the start of a cycle will tend to reduce the forward energy transferred during the cycle. On a cycle by cycle basis, the energy transferred per cycle will depend upon the initial voltage on the capacitor 20 which will itself vary from cycle to cycle. The result is a variation in converter operating frequency as the controller attempts to maintain constant forward power flow. As load is reduced further, the converter operating period increases and bidirectional energy transfer between the second inductor 24 and the capacitor 20 occurs during each operating cycle. Besides resulting in a periodic operating mode, the relatively low frequency resonance characteristic of this "discontinuous mode" appears at the output in the form of increased output noise.

In the converter operating in reverse boost mode, the discontinuous mode is eliminated since the second switching device 28 prevents reverse energy transfer between the second inductor 24 and the capacitor 20. For the component values previously defined, operation at an average output current of 1 Ampere occurs at a stable converter operating frequency of about 161 Kilohertz. This is higher than the operating frequency of the prior art converter operating at the same load because the value of the second inductor 24 has been reduced, and current reversal in the second inductor (at a value Ix of about 1.8 Amperes) is occurring in the present converter at this value of load, resulting in a reduction of forward energy transferred per cycle. No load operation occurs at a converter operating frequency of about 65 Kilohertz, at which frequency the forward power flow just compensates for the losses in the second switch 28 and the other output circuit components (about 1.8 Watts). At this operating frequency, the value of Ix is about 9 Amperes, and the period of the forward energy transfer interval has been reduced to about 0.32 microseconds.

In its simplest form, reverse boost would be implemented by using the circuit of FIG. 3 as the second switch 28 in the converter of FIG. 2A. The value of second inductor 24 would be reduced relative to a prior art converter. The controller 32 would open the unidirectional switch 52 at essentially the same time that the first switch 26 was closed, and close the unidirectional switch 52 when the capacitor 20 voltage returned to zero. The variable frequency control circuit of the prior art converter would be used as the control circuit 22 for the first switch. At relatively high loads, the operating frequency would be relatively high, and the current in the second inductor 24 would always flow in a positive direction. Under these conditions, opening the unidirectional switch 52 at essentially the time that the first switch 26 is closed will have no effect on converter behavior—the second unidirectional conducting device 50 of FIG. 3 will carry the positive current Iout ensuring operation as a prior art converter. As load is decreased, a value of load will be reached where current reversal will start to occur in the second inductor 24. The blocking effect of reverse boost on forward power flow will start to be asserted, and the rate of decrease of frequency will not occur as rapidly as the rate of decrease of load. Reverse boost will become a self-regulating process in that the converter operating frequency will stabilize at a value such that the reverse current in the second inductor 24 at the start of a cycle (Ix of Equation 10) is sufficient to maintain the output voltage in regulation at the particular value of load. At no load, the lower limit on operating frequency in the reverse boost mode of operation will effectively be dependent upon the small amount of losses present in the circuit elements forming the output circuit. A value of Ix will be reached at which forward power flow will just be sufficient to compensate for output circuit losses.

As demonstrated above, by providing a mechanism for supporting negative flow of current I2, the topology of FIG. 2A may be used to selectively regulate the amount of forward energy transferred during a converter operating cycle, while simultaneously regulating reverse energy transfer from energy storing elements in the load to the capacitor 20. Elimination of the "discontinuous" operating mode at low values of load, and reduction in the range of frequencies over which the converter operates as load is reduced, are two of the resulting benefits. Through use of an appropriate controller 32 (which may be a part of control circuit 22), and correspondingly appropriate values of the circuit elements, many possible converter operating modes can be realized which exploit this mechanism. Thus, in the simplest case, discussed above, reverse boost might be used solely to eliminate the discontinuous mode at light loads while raising the minimum converter operating frequency.

What is claimed is:

1. A zero-current switching forward converter circuit for delivering power to a load, comprising:
   a voltage source;
   a power transformer including primary and secondary windings, said power transformer having an effective secondary leakage inductance L2e;
   a first switching device connected to couple said voltage source across the primary winding of said transformer;
   a first unidirectional conducting device connected in series with said secondary winding and oriented to conduct during conduction by said first switching device;
   a capacitor of capacitance C connected in series with said secondary winding and said first unidirectional conducting device;
   an inductor of inductance Lo connected in series between said capacitor and said load to deliver power to said load;
   circuit means connected on the secondary side of said transformer for preventing charging of said capacitor when voltage across said capacitor returns essentially to zero and when current in said inductor is flowing in the direction of said load;
   a second switching device connected on the secondary side of said transformer;
   damping means for damping a resonant circuit formed by said inductor and said capacitor at times when said second switching device is closed and the current in said inductor is flowing in a direction away from said load, said damping means comprising a dissipative element connected on the secondary side of said transformer; and
   a controller having means for closing and opening said first switching device to transfer energy from said voltage source via the effective leakage inductance of said transformer to charge said capacitance during an energy transfer cycle having a characteristic time scale of pi* sqrt(L2e*C), said controller causing said first switching device to open at times when current in said secondary winding is substantially zero, said controller including a second means for opening and closing said second switching device to selectively govern the amount of energy transferred during said energy transfer cycle.

2. The converter circuit of claim 1, wherein said dissipative element is a resistance having a value essentially equal to ½*sqrt(Lo/C) ohms.

3. The converter circuit of claim 1, wherein said dissipative element has a resistance between ¼*sqrt(Lo/C) ohms and sqrt(Lo/C) ohms.

4. The converter circuit of claim 1, wherein said dissipative element comprises a resistor having an essentially fixed value.

5. The converter circuit of claim 1, wherein said dissipative element comprises a positive temperature coefficient thermistor.

6. The convertor circuit of claim 1, wherein said circuit means comprises a second unidirectional conducting device connected across said capacitor.

7. The convertor circuit of claim 1, wherein said second switching device and said dissipative element form a series circuit, said series circuit being connected across said capacitor.

8. The convertor circuit of claim -1 wherein said circuit means comprises a second unidirectional conducting device connected across said capacitor, and wherein said second switching device and said dissipative element form a series circuit, said series circuit being connected across said capacitor.

9. The converter circuit of claim 8, wherein said second switching device comprises a switch capable of unidirectional conduction when closed, said second switching device and said second unidirectional conducting device being oriented to conduct in opposite directions.

10. The converter circuit of claim 1, wherein said second switching device comprises a field effect transistor.

11. The converter circuit of claim 1, wherein said second switching device comprises a bipolar transistor.

12. A zero-current switching forward converter circuit for delivering power to a load, comprising:
a voltage source;
a power transformer including primary and secondary windings, said power transformer having an effective secondary leakage inductance L2e;
a first switching device connected to couple said voltage source across the primary winding of said transformer;
a first unidirectional conducing device connected in series with said secondary winding and oriented to conduct during conduction by said first switching device;
a capacitor of capacitance C connected in series with said secondary winding and said first unidirectional conducting device; 'an inductor of inductance Lo connected in series between said capacitor and said load to deliver power to said load;
circuit means connected on the secondary side of said transformer for preventing charging of said capacitor when voltage across said capacitor returns essentially to zero and when current in said inductor is flowing in the direction of said load;
a second switching device connected on the secondary side of said transformer; and
damping means for damping a resonant circuit formed by said inductor and said capacitor at times when said second switching device is closed and the current in said inductor is flowing in a direction away from said load, said damping means comprising a dissipative element connected on the secondary side of said transformer;
a controller having means for closing and opening said first switching device to transfer energy from said voltage source via the effective leakage inductance of said transformer to charge said capacitance during an energy transfer cycle having a characteristic time scale of pi* sqrt(L2e*C), said controller causing said first switching device to open at times when current in said secondary winding is substantially zero, said controller including a second means for opening and closing said second switching device to selectively govern the amount of energy transferred during said energy transfer cycle;
wherein said second means for opening and closing said second switching device comprises
means for detecting closure of said first switching device; and
means for opening said second switching device at substantially the same time that said first switching device is closed.

13. The converter circuit of claim 12, wherein said second means for opening and closing said second switching device further comprises
means for detecting the voltage across said capacitor; and
means for closing said second switching device when the voltage across said capacitor is substantially zero.

14. A zero-current switching forward converter circuit for delivering power to a load, comprising:
a voltage source;
a power transformer including primary and secondary windings, said power transformer having an effective secondary leakage inductance L2e;
a first switching device connected to couple said voltage source across the primary winding of said transformer;
a first unidirectional conducting device connected in series with said secondary winding and oriented to conduct during conduction by said first switching device;
a capacitor of capacitance C connected in series with said secondary winding and said first unidirectional conducting device;
an inductor of inductance Lo connected in series between said capacitor and said load to deliver power to said load;
a second unidirectional conducting device connected in parallel with said capacitor, said second unidirectional conducting device being oriented to prevent charging of said capacitor when voltage across said capacitor returns essentially to zero and current in said inductor is flowing in the direction of said load;
a series circuit connected in parallel with said capacitor, said series circuit comprising a second switching device connected in series with a dissipative element, said dissipative element serving to damp the resonant circuit formed by said inductor and said capacitor at times when said second switching device is closed and the current flowing in said inductor is flowing in a direction away from said load; and
a controller having means for closing and opening said first switching device to transfer energy from said voltage source via the effective leakage inductance of said transformer to charge said capacitance during an energy transfer cycle having a characteristic time scale of pi* sqrt(L2e*C), said controller causing said first switching device to open at times when current in said secondary winding is substantially zero, said controller including a second means for opening and closing said second switching device to selectively govern the amount of energy transferred during said energy transfer cycle;
wherein said dissipative element is a resistance having a value essentially equal to ½*sqrt(Lo/C) ohms;

wherein said second means for opening and closing said second switching device comprises means for detecting closure of said first switching device, means for opening said second switching device at substantially the same time that said first switching device is closed, means for detecting voltage across said capacitor, and means for closing said second switching device when voltage across said capacitor is substantially zero; and wherein said second switching device comprises a switch capable of unidirectional conduction when closed, said second switching device and said second unidirectional conduction device being oriented to conduct in opposite directions.

15. A method of controlling a converter circuit in a damped reverse boost mode, said method comprising the steps of providing a voltage source;

providing a power transformer including primary and secondary windings, said power transformer having an effective secondary leakage inductance L2e;

coupling said voltage source across the primary winding of said transformer via a first switching device;

providing a first unidirectional conducting device connected in series with said secondary winding and oriented to conduct during conduction by said first switching device;

providing a capacitor of capacitance C connected in series with said secondary winding and said first unidirectional conducting device;

providing an inductor of inductance Lo connected in series between said capacitor and said load to deliver power to said load;

preventing charging of said capacitor when voltage across said capacitor returns essentially to zero and when current in said inductor is flowing in the direction of said load by providing circuit means connected on the secondary side of said transformer;

providing a second switching device connected on the secondary side of said transformer;

damping a resonant circuit formed by said inductor and said capacitor at times when said second switching device is closed and the current in said inductor is flowing in a direction away from said load using a dissipative element connected on the secondary side of said transformer;

closing and opening said first switching device to transfer energy from said voltage source via the effective leakage inductance of said transformer to charge said capacitance during an energy transfer cycle having a characteristic time scale of p*sqrt(L2e*C); and causing said first switching device to open at times when current in said secondary winding is substantially zero; and closing said second switching device when the voltage across said capacitor is substantially zero to minimize oscillations in the voltage across said capacitor in response to reverse current flow in said inductor.

16. The method of claim 15, further comprising the step of opening said second switching device at substantially the same time that said first switching device is closed.

* * * * *

UNITED STATES PATENT AND TRADEMARK OFFICE
CERTIFICATE OF CORRECTION

PATENT NO. : 5,291,385

DATED : March 1, 1994

INVENTOR(S) : Patrizio Vinciarelli

It is certified that error appears in the above-identified patent and that said Letters Patent is hereby corrected as shown below:

Please replace Figure 1A with the following Figure 1A.

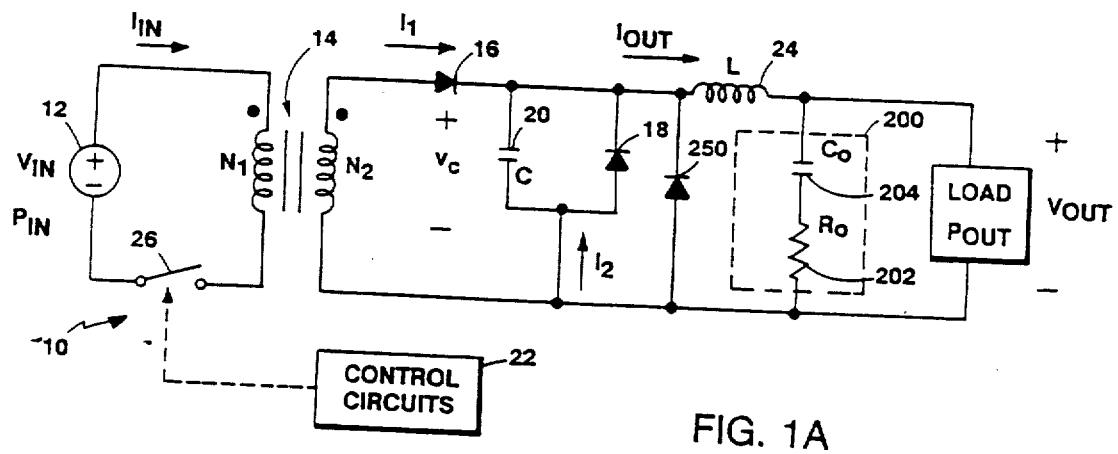

FIG. 1A

Signed and Sealed this

Fifth Day of December, 1995

Attest:

*Attesting Officer*

BRUCE LEHMAN

*Commissioner of Patents and Trademarks*

UNITED STATES PATENT AND TRADEMARK OFFICE
CERTIFICATE OF CORRECTION

PATENT NO. : 5,291,385
DATED : March 1, 1994
INVENTOR(S) : Patrizzio Vinciarelli Page 1 of 2

It is certified that error appears in the above-indentified patent and that said Letters Patent is hereby corrected as shown below:

Please replace Figure 1A with the following Figure 1A.

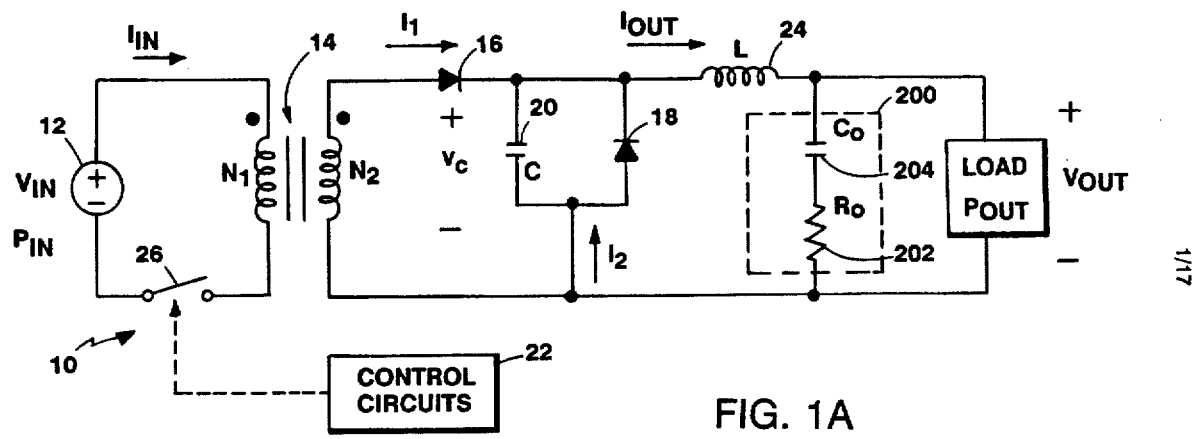

FIG. 1A

UNITED STATES PATENT AND TRADEMARK OFFICE
CERTIFICATE OF CORRECTION

PATENT NO.   : 5,291,385

DATED        : March 1, 1994

INVENTOR(S)  : Patrizzio Vinciarelli

It is certified that error appears in the above-identified patent and that said Letters Patent is hereby corrected as shown below:

Please replace Figure 7 with the following Figure 7.

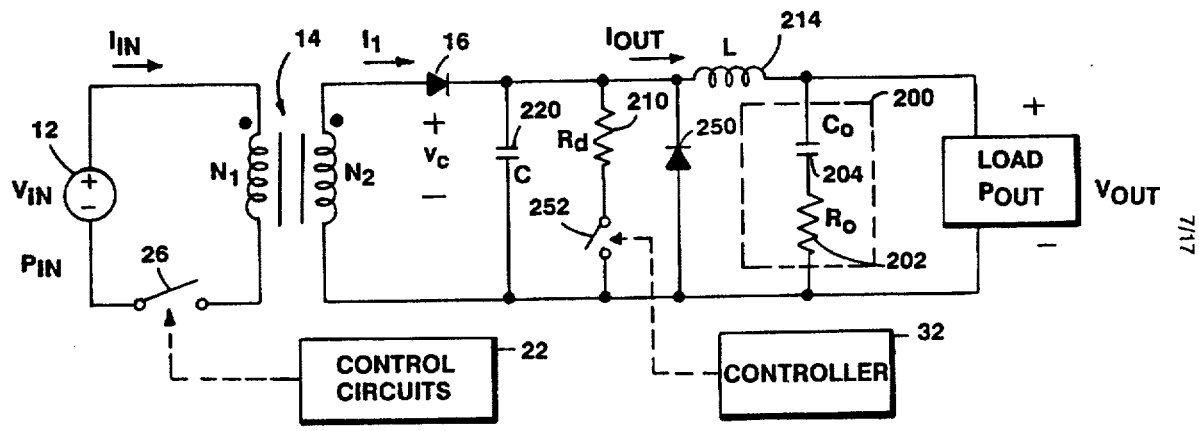

FIG. 7

Signed and Sealed this

Fifth Day of August, 1997

*Attest:*

*Attesting Officer*

BRUCE LEHMAN

Commissioner of Patents and Trademarks